US006871106B1

(12) United States Patent
Ishikawa et al.

(10) Patent No.: US 6,871,106 B1
(45) Date of Patent: Mar. 22, 2005

(54) AUDIO SIGNAL CODING APPARATUS, AUDIO SIGNAL DECODING APPARATUS, AND AUDIO SIGNAL CODING AND DECODING APPARATUS

(75) Inventors: Tomokazu Ishikawa, Toyonaka (JP); Mineo Tsushima, Katano (JP); Takeshi Norimatsu, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/266,631

(22) Filed: Mar. 11, 1999

(30) Foreign Application Priority Data

Mar. 11, 1998 (JP) .......................................... 10-059403

(51) Int. Cl.[7] ................................................ G06F 17/00
(52) U.S. Cl. ......................... 700/94; 704/205; 704/222
(58) Field of Search .............................. 381/2; 700/94; 704/205, 222

(56) References Cited

U.S. PATENT DOCUMENTS 5,677,994 A * 10/1997 Miyamori et al. .......... 704/501
5,781,888 A * 7/1998 Herre ....................... 704/200.1
5,909,664 A * 6/1999 Davis et al. ............. 704/200.1
5,913,191 A * 6/1999 Fielder ........................ 704/230
6,604,069 B1 * 8/2003 Tsutsui ..................... 704/200.1

FOREIGN PATENT DOCUMENTS

EP 0770985 5/1997
WO 97/21211 6/1997

OTHER PUBLICATIONS

K. Ikeda et al., "A Design of Twin VQ Audio–Codec for Personal Communication Systems", IEEE International Conference on Universal Personal Communications, US, New York, IEEE, vol. CONF. 4, Nov. 6, 1995, pp. 803–807, XP000690062, ISBN: 0–7803–2955–4.

A. Jin et al., "Scalable Audio Coder Based On Quantizer Units of MDCT Coefficients", Phoenix, AZ, Mar. 15–19, 1999, New York, NY: IEEE, US, Mar. 15, 1999, pp. 897–900, XP000900266, ISBN: 0–7803–5042–1.

* cited by examiner

*Primary Examiner*—Minsun Oh Harvey
*Assistant Examiner*—Laura A. Grier
(74) *Attorney, Agent, or Firm*—Wenderoth, Lind & Ponack, L.L.P.

(57) ABSTRACT

An audio signal coding apparatus includes a first-stage encoder for quantizing the time-to-frequency transformed audio signal and second-and-subsequent-stages of encoders each for quantizing a quantization error output from the previous-stage encoder A characteristic decision unit is provided which decides the frequency band of an audio signal to be quantized by each encoder of multiple-stage encoders, and a coding band control unit receives the frequency band decided by the characteristic decision unit and the time-to-frequency transformed audio signal, decides the order of connecting the respective encoders, and transforms the quantization bands of the encoders and the connecting order to code sequences. Therefore, it is possible to provide an audio signal coding apparatus performing adaptive scalable coding, which exhibits sufficient performance when coding various audio signals.

46 Claims, 15 Drawing Sheets

AUDIO SIGNAL CODING APPARATUS, AUDIO SIGNAL DECODING APPARATUS, AND AUDIO SIGNAL CODING AND DECODING APPARATUS

FIELD OF THE INVENTION

The present invention relates to an audio signal coding apparatus which efficiently encodes a signal which is obtained by transforming an audio signal such as a voice signal or music signal by using a method such as orthogonal transformation, so as to represent the same signal with less code sequences relative to the original audio signal, using a characteristics quantity which is obtained from the audio signal itself. The invention also relates to an audio signal decoding apparatus which can decode a high-quality and broad-band audio signal by using all or part of the, code sequences as the coded signal.

BACKGROUND OF THE INVENTION

There have been proposed various methods for efficiently coding and decoding audio signals. Compressive coding methods for audio signals having frequency bands exceeding 20 kHz such as music signals, MPEG audio and Twin VQ (TC-WVQ) have been proposed. In a coding method represented by MPEG audio system, a digital audio signal on a time axis is transformed to data on a frequency axis by using orthogonal transformation such as cosine transformation, and the data on the frequency axis is encoded from acoustically important data by utilizing acoustic characteristics of human beings, while acoustically unimportant data and redundant data are not encoded. On the other hand, Twin VQ (TC-WVQ) is a coding method in which an audio signal is represented with data quantity considerably smaller than that of the original digital signal by using vector quantization. MPEG audio and Twin VQ are described in "ISO/IEC standard IS-11172-3" and "T. Moriya, H. Suga: An 8 Kbits transform coder for noisy channels, Proc. ICASSP 89, pp.196–199", respectively.

Hereinafter, the outline of the general Twin VQ system will be described with reference to FIG. 10.

An original audio signal 101 is input to an analysis scale decision unit 102 to calculate an analysis scale 112. At the same time, the analysis scale decision unit 102 quantizes the analysis scale 112 to output an analysis scale code sequence 111. Next, a time-to-frequency transformation unit 103 transforms the original audio signal 101 to an original audio signal 104 in frequency domain. Next, a normalization unit (flattening unit) 106 subjects the original audio signal 104 in frequency domain to normalization (flattening) to obtain an audio signal 108 after normalization. This normalization is performed by calculating a frequency outline 105 from the original audio signal 104 and then dividing the original audio signal 104 with the calculated frequency outline 105. Further, the normalization unit 106 quantizes the frequency outline information used for the normalization to output a normalized code sequence 107. Next, a vector quantization unit 109 quantizes the audio signal 108 after normalization to obtain a code sequence 110.

In recent years, there has been proposed a decoder having a structure capable of reproducing an audio signal by using part of code sequences input thereto. This structure is called "scalable structure", and to encode an audio signal so as to realize the scalable structure is called "scalable coding".

FIG. 11 shows an example of fixed scalable coding which is employed in a general Twin VQ system.

According to an analysis scale 1314 decided from an original audio signal 1301 by an analysis scale decision unit 1303, an original audio signal 1304 in the frequency domain is obtained by a time-to-frequency conversion unit 1302. A low-band encoder 1305 receives the original audio signal 1304 in the frequency domain and outputs a quantization error 1306 and a low-band code sequence 1311. An intermediate-band encoder 1307 receives the quantization error 1306 and outputs a quantization error 1308 and an intermediate-band code sequence 1312. A high-band encoder 1309 receives the quantization error 1308 and outputs a quantization error 1310 and a high-band code sequence 1313. Each of the low-band, intermediate-band, and high-band encoders comprises a normalization unit and a vector quantization unit, and outputs a low-band, or intermediate band, or high-band code sequence including a quantization error and code sequences output from the normalization unit and the vector quantization unit.

In the conventional fixed scalable coding shown in FIG. 11, since the low-band, intermediate-band, and high-band encoders (quantizers) are fixed, it is difficult to encode the original audio signal so as to minimize the quantization errors against the distribution of the original audio signal as shown in FIG. 12. Therefore, when coding audio signals having various characteristics and distributions, sufficient performance is not exhibited, and high-quality and high-efficiency scalable coding cannot be realized.

SUMMARY OF THE INVENTION

The present invention is made to solve the above-described problems and has for its object to provide an audio signal coding apparatus which efficiently encodes various audio signals at a low bit rate, and with high sound quality, by subjecting the audio signals to adaptive scalable coding as shown in FIG. 13.

It is another object of the present invention to provide an audio signal decoding apparatus adapted to the above-mentioned audio signal coding apparatus.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an audio signal coding apparatus that receives an audio signal which has been time-to-frequency transformed, and outputs a coded audio signal, wherein the apparatus comprises a first-stage encoder for quantizing the time-to-frequency transformed audio signal; second-and-subsequent-stages of encoders each for quantizing a quantization error output from the previous-stage encoder; and a characteristic decision unit for judging the characteristic of the time-to-frequency transformed audio signal, and deciding the frequency band of the audio signal to be quantized by each of the encoders in the multiple stages. The apparatus according to the present invention also includes a coding band control unit for receiving the frequency band decided by the characteristic decision unit and the time-to-frequency transformed audio signal, deciding the connecting order of the encoders in the multiple stages, and transforming the quantization bands of the respective encoders and the connecting order to code sequences. Thereby, the frequency band to be quantized by each of the multiple encoders and the connecting order of these encoders are decided according to the characteristic of the input audio signal, followed by adaptive scalable coding. Therefore, high-quality and high-efficiency adaptive scalable coding is realized.

According to a second aspect of the present invention, in the audio signal coding apparatus of the first aspect the encoders comprise a normalization unit for calculating a normalized coefficient sequence for normalizing the time-to-frequency transformed audio signal, from the audio signal, quantizing the normalized coefficient sequence by using a vector quantization method, and outputting a normalized signal obtained by normalizing the time-to-frequency audio signal; and at least one stage vector quantization unit for quantizing the signal normalized by the normalization unit. Since each encoder performs at least one stage of vector quantization after normalization of the time-to-frequency transformed audio signal, high-quality and high-efficiency adaptive scalable coding is realized.

According to a third aspect of the present invention, in the audio signal coding apparatus of the first or second aspect, the coding band control unit selects a frequency band having an energy addition sum of quantization error larger than a predetermined value, as a frequency band of the audio signal to be quantized by each encoder. Since the band having a large energy sum of quantization error is selectively quantized, high-quality and high-efficiency adaptive scalable coding is realized.

According to a fourth aspect of the present invention, in the audio signal coding apparatus of the first or second aspect, the coding band control unit selects a frequency band having an energy addition sum of quantization error larger than a predetermined value, which band is heavily weighted with regard to psychoacoustic characteristics of human beings, as a frequency band of the audio signal to be quantized by each encoder. Since the frequency band having an energy addition sum of quantization error which is weighted with psychoacoustic characteristics of human beings that is larger than a predetermined value is selectively quantized, high-quality and high-efficiency adaptive scalable coding is realized.

According to a fifth aspect of the present invention, in the audio signal coding apparatus of the first or second aspect, the coding band control unit retrieves, at least once, the whole frequency band of the input audio signal. Since the whole frequency band of the input audio signal is quantized at least once, high-quality and high-efficiency adaptive scalable coding is realized.

According to a sixth aspect of the present invention, in the audio signal coding apparatus of the second aspect, the vector quantization unit calculates the quantization error in vector quantization by using a vector quantization method with a code book, and outputs the result of the vector quantization as a code sequence. Since the vector quantization method using the code book is employed in the quantization, high-quality and high-efficiency adaptive scalable coding is realized.

According to a seventh aspect of the present invention, in the audio signal coding apparatus of the sixth aspect, the vector quantization unit uses, for retrieval of on optimum code in the vector quantization, a code vector in which all or part of the codes of the vector is inverted. Since the inverted code vector is employed, high-quality and high-efficiency adaptive scalable coding is realized.

According to an eighth aspect of the present invention, in the audio signal coding apparatus of the sixth aspect, the vector quantization unit extracts, in calculating distances which are used for retrieving an optimum code in vector quantization, a code giving the minimum distance by using the normalized coefficient sequence of the input signal calculated by the normalization unit as a weight. Since the normalized coefficient sequence of the input signal is used as a weight in extracting a code giving the minimum distance when calculating the distances for retvieving the optimum code, high-quality and high-efficiency adaptive scalable coding is realized.

According to a ninth aspect of the present invention, in the audio signal coding apparatus of the sixth aspect, the vector quantization unit extracts, in calculating distances which are used for retrieving an optimum code in vector quantization, a code giving the minimum distance by using both of the normalized coefficient sequence calculated by the normalization unit and a value in consideration of psychoacoustic characteristics of human beings as weights. Since both of the normalized coefficient sequence calculated by the normalization unit and a value in consideration of psychoacoustic characteristics of human beings are employed as weights in extracting a code giving the minimum distance when calculating the distances for retrieving the optimum code, high-quality and high-efficiency adaptive scalable coding is realized.

According to a tenth aspect of the present invention, there is provided an audio signal decoding apparatus for decoding a coded audio signal which is output from the audio signal coding apparatus of the present invention to output an audio signal, said apparatus comprising: an inverse quantization means comprising a single inverse quantizer or multiple-stages of inverse quantizers, for reproducing the coefficient sequence of the time-to-frequency transformed audio signal, from the input audio signal code sequence, on the basis of the quantization bands of the respective encoders of each of the multiple stages and the connecting order of these encoders, which are decided by the characteristic decision unit and the coding band control unit included in the audio signal coding apparatus; and a frequency-to-time transformation unit for transforming the output of the inverse quantization means, which is the coefficient sequence of the time-to-frequency transformed audio signal, to a signal corresponding to the original audio signal. Therefore, a decoding apparatus capable of decoding the code sequence output from the coding apparatus of the first aspect is realized.

According to an eleventh aspect of the present invention, in the audio signal decoding apparatus of the tenth aspect, the inverse quantization means comprising a single stage inverse quantizer or each of inverse quantizers of multiple stages receives the code sequences output from the encoders of the respective frequency bands of the audio signal coding apparatus, and reproduces the coefficient sequence of the time-to-frequency transformed audio signal from the input audio signal code sequences. The inverse quantization means includes an inverse normalization unit for receiving the coefficient sequence of the time-to-frequency transformed audio signal, which is output from the inverse quantization means, and the normalized code sequences output from the encoders of the respective frequency bands in the audio signal coding apparatus, and obtaining a signal corresponding to the time-to-frequency transformed audio signal, wherein the frequency-to-time transformation unit transforms the output of the inverse normalization unit to a signal corresponding to the original audio signal. Therefore, a decoding apparatus capable of decoding a code sequence output from the coding apparatus of the second aspect is realized.

According to a twelfth aspect of the present invention, in the audio signal decoding apparatus of the tenth or eleventh aspect, the inverse quantization means performs inverse quantization by using only the codes which are output from some of the plurality of encoders in the audio signal coding apparatus. In the case where coding is performed while varying the quantization bands of the encoders and the connecting order thereof in accordance with the characteristic of the audio signal, it is possible to realize a decoding apparatus which has a simple structure and performs high-quality decoding by using only some part of the outputs from the encoders.

According to a thirteenth aspect of the present invention, in the audio signal coding apparatus of the first aspect, the characteristic decision unit properly selects a band to be quantized in accordance with a signal obtained by processing the time-to-frequency transformed audio signal input to the characteristic decision unit by a low-pass filter. Therefore, it is possible to realize high-quality and high-efficiency adaptive scalable coding in accordance with the characteristic of the low-pass filter, i.e., in which the low-band is audible.

According to a fourteenth aspect of the present invention, in the audio signal coding apparatus of the first aspect, the characteristic decision unit properly selects a band to be quantized in accordance with a signal obtained by subjecting the time-to-frequency transformed audio signal input to the characteristic decision unit to a processing including logarithmic calculation. Therefore, it is possible to realize high-quality and high-efficiency adaptive scalable coding, in accordance with the processing including the logarithmic calculation, resulting in the signal being adapted to the psychoacoustic characteristics of human beings.

According to a fifteenth aspect of the present invention, in the audio signal coding apparatus of the first aspect, the characteristic decision unit properly selects a band to be quantized, in accordance with a signal obtained by processing the time-to-frequency transformed audio signal input to the characteristic decision unit by a high-pass filter. Therefore, it is possible to realize high-quality and high-efficiency scalable coding in accordance with the charcteristic of the high-pass filter, i.e., in which the high-frequency components are included a lot.

According to a sixteenth aspect of the present invention, in the audio signal coding apparatus of the first aspect, the characteristic decision unit properly selects a band to be quantized in accordance with a signal obtained by processing the time-to-frequency transformed audio signal input to the characteristic decision unit by a band-pass filter or a band-rejection filter. Therefore, it is possible to realize high-quality and high-efficiency adaptive scalable coding in accordance with the characteristic of the band-pass filter or the band-rejection filter, i.e., in which only a predetermined band is audible or a predetermined band is rejected.

According to a seventeenth aspect of the present invention, in the audio signal coding apparatus of the first aspect, the characteristic decision unit decides the characteristic of the input audio signal, and properly selects a band to be quantized by each encoder in accordance with the result of the decision. Since the band to be quantized by each encoder is appropriately selected according to the characteristic of the audio signal, high-quality and high-efficiency adaptive scalable coding is realized.

According to an eighteenth aspect of the present invention, in the audio signal coding apparatus of the seventeenth aspect, the characteristic decision unit decides the characteristic of the input audio signal and restricts the band to be quantized by each encoder in accordance with the result of the decision. Since the band to be quantized by each encoder is restricted according to the characteristic of the audio signal, high-quality and high-efficiency adaptive scalable coding is realized.

According to a nineteenth aspect of the present invention, in the audio signal coding apparatus of the eighteenth aspect, when the frequency band is divided into a low-band, an intermediate-band, and a high-band and the bands to be quantized by the respective encoders are to be restricted, and when the input audio signal has variable characteristics, the bands to be quantized are controlled so that the high-band is selected more than the other bands. Therefore, it is possible to realize high-quality and high-efficiency adaptive scalable coding in which rapidly changing high frequency components are included a lot. According to a twentieth aspect of the present invention, in the audio signal coding apparatus of the eighteenth aspect, when the band is divided into a low-band, an intermediate-band, and a high-band and the high-band is selected more than the other bands for the bands to be quantized by the respective encoders, the bands to be quantized are controlled so that most of the bands to be quantized are in the high-band, for a predetermined period from when the high-band is selected. Therefore, it is possible to avoid that the state where the high frequency components are included a lot is suddenly changed to a different state.

According to a twenty-first aspect of the present invention, in the audio signal coding apparatus of the eighteenth aspect, the band is divided into a low-band, an intermediate-band and a high-band, and the characteristic of the original input audio signal is judged, and the bands to be quantized by the respective encoders are fixed dependent on the result of the judgment. Since the bands to be quantized by the respective encoders are fixed according to the characteristic of the input audio signal, high-efficiency fixed scalable coding is realized.

According to a twenty-second aspect of the present invention, in the audio signal coding apparatus of the first aspect, the characteristic decision unit uses one or both of the frequency outline of the time-to-frequency transformed audio signal and the normalized coefficient sequence calculated by the normalization unit, as a weight or weights for deciding the quantization band of the respective encoders. Since one or both of the frequency outline of the time-to-frequency transformed audio signal and the normalized coefficient sequence are used as weights for deciding the quantization band of each encoder, high-quality and high-efficiency adaptive scalable coding is realized.

According to a twenty-third aspect of the present invention, the audio signal coding apparatus of the first aspect further comprises a characteristic decision unit for judging psycho acoustic and physical characteristics of the audio signal to be quantized by the respective encoders of each stage; a coding band control unit for controlling the arrangment of the bands to be quantized by the respective encoders of each stage, in accordance with the coding band arrangement information decided by the characteristic decision unit; and the processings by the characteristic decision unit and the coding band control unit being repeated until a predetermined coding condition is satisfied. Since the arrangement of the quantization bands of the respective encoders are decided according to the result of decision on the psycho acoustic and physical characteristics of the audio signal and the adjustment of the arrangement of the band is repeated until the coding condition is satisfied, high-quality and high-efficiency adaptive scalable coding is realized.

According to a twenty-fourth aspect of the present invention, in the audio signal coding apparatus of the twenty-third aspect, the characteristic decision unit comprises a coding band calculation unit which receives predetermined coding condition and calculates coding band information indicating the coding bands of the respective encoders of each stage; a psychoacoustic model calculation unit which receives the coding band information, the output of a predetermined filter which filters one of a frequency-domain audio signal and a difference spectrum, and outputs a psychoacoustic weight representing the psycho acoustic importance in the coding bands of the coding band information; an arrangement decision unit which receives the psychoacoustic weight and an analysis scale output from an analysis scale decision unit, determines the arrangement of the encoders, and outputs the band numbers of the encoders; and a coding band arrangement information generation unit which receives the coding band information and the band numbers, and outputs coding band arrangement information in accordance with the predetermined coding condition. Since the arrangement of the coding bands of the respective encoders is decided in consideration of the psychoacoustic weight representing the psycho acoustic importance of human beings, high-quality and high-efficiency adaptive scalable coding is realized.

According to a twenty-fifth aspect of the present invention, the audio signal coding apparatus of the twenty-third aspect further comprises a spectrum shift means which receives the time-to-frequency transformed audio signal and the coding band arrangement information and shifts the spectrum of the input audio signal to a specified band; an encoder which encodes the output of the spectrum shifting means, to output a code sequence; a decoding band control unit which decodes the code sequence output from the encoder to output a decoded spectrum; a difference calculation means which calculates a difference between the decoded spectrum and the time-to-frequency transformed audio signal; and a difference spectrum holding means which holds the current difference information up to the next operation period of the coding band control unit. Thereby, the spectrum of the original audio signal is shifted to a band specified by the coding band arrangement information, and a difference between the decoded spectrum which is obtained by the shifted spectrum being coded and then decoded and the spectrum of the original audio signal is calculated, and thus the shift amount of the spectrum of the original audio signal at present is decided according to this difference in the past, whereby the next connecting state of the respective encoders can be controlled so that the quantization error at present is reduced, in accordance with the respective differences of the coding obtained by successively shifting the bands to be coded, resulting in high-quality and high-efficiency adaptive scalable coding.

According to a twenty-sixth aspect of the present invention, in the audio signal coding apparatus of the twenty-fifth aspect, the decoding band control unit comprises a decoder which decodes the code sequence, to output a composite spectrum; spectrum shift means for shifting the composite spectrum to a specified band, in accordance with the coding band arrangement information included in the code sequence; and a decoded spectrum calculation unit which holds the current composite spectrum up to the next operation period of the decoding band control unit starts and adds the past composite spectrum and the current composite spectrum. Therefore, it is possible to control the arrangement of the bands to be quantized by the respective encoders at present and the connecting state of the bands in accordance with the arrangement of the bands and the connecting state of the bands in the past, resulting in high-quality and high-efficiency adaptive scalable coding.

According to a twenty-seventh aspect of the present invention, there is provided an audio signal decoding apparatus for decoding a coded audio signal which is output from the audio signal coding apparatus of the present invention to output an audio signal, which further comprises a decoding band control unit which has the same structure as the decoding band control unit included in the audio signal coding apparatus. Therefore, it is possible to realize an audio signal decoding apparatus capable of decoding a coded signal which is obtained by high-quality and high-efficiency adaptive scalable coding in which the arrangement of the bands and the connecting state thereof to be quantized by the respective encoders are controlled according to the arrangement of the bands and the connecting state thereof in the past.

According to a twenty-eighth aspect of the present invention, there is provided an audio signal coding and decoding apparatus comprising the audio signal coding apparatus of the present invention and an audio signal decoding apparatus for decoding a coded audio signal output from the audio signal coding apparatus to output an audio signal, wherein said audio signal decoding apparatus includes a decoding band control unit which has the same structure as the decoding band control unit included in the audio signal coding apparatus. Therefore, it is possible to realize an audio signal coding and decoding apparatus which comprises an audio signal coding apparatus capable of high-quality and high-efficiency adaptive scalable coding in which the current arrangement of the bands and the connecting state thereof at present are controlled according to the arrangement of the bands and the connecting state thereof in the past, and an audio signal decoding apparatus capable of decoding the output from the coding apparatus.

According to a twenty-ninth aspect of the present invention, in the audio signal decoding apparatus of the twenty-seventh aspect, the spectrum shift means included in the audio signal coding apparatus receives the spectrum to be shifted and the coding band arrangement information, and outputs the coding band information and the shifted spectrum. Therefore, high-quality and high-efficiency adaptive scalable coding in which the arrangement of the bands to be encoded by the respective encoders and the connecting state thereof at present can be controlled in accordance with arrangement of the bands and the connecting state thereof in the past is realized.

According to a thirtieth aspect of the present invention, in the audio signal coding apparatus of the twenty-fourth aspect, when the input audio signal has rapidly changing characteristics, i.e., the analysis scale is small, said arrangement decision unit controls the coding bands of the respective encoders so that the high-band is selected more than the other bands. Thereby, even when the characteristic of the input audio signal is rapidly changing, it is possible to perform high-quality and high-efficiency adaptive scalable coding in which high frequency components are included a lot in the bands to be encoded.

According to a thirty-first aspect of the present invention, in the audio signal coding apparatus of the twenty-fourth aspect, when the input audio signal has rapidly changing characteristics, i.e., the analysis scale is small, said arrangement decision unit controls the coding bands so that the high-band is selected more than the other bands for a predetermined period from when the high-band is selected. Therefore, when the characteristic of the input audio signal is rapidly changing, for a predetermined period from that point of time, it is possible to avoid that the state where the high frequency components are included a lot is suddenly changed to a different state, resulting in high-quality and high-efficiency adaptive scalable coding.

According to a thirty-second aspect of the present invention, in the audio signal coding apparatus of the twenty-fourth aspect, the coding band calculation unit has a functional relation between the coding band information which is the output of the coding band calculation unit and the bit rate or the sampling frequency of the input signal included in the input coding condition, wherein the functional relation comprises one of a polynomial function, a logarithmic function, and a combination of these functions. Therefore, high-quality and high-efficiency adaptive scalable coding according to the coding condition is realized.

According to a thirty-third aspect of the present invention, in the audio signal coding apparatus of the thirty-second aspect, when the total number of the encoders is three or more as one of the coding conditions, the upper limit of the coding band of the third encoder in the order of increasing frequency is at least half of the frequency band of the original audio signal. Since the apparatus possesses at least three encoders, high-quality and high-efficiency adaptive scalable coding is realized.

According to a thirty-fourth aspect of the present invention, in the audio signal coding apparatus of the thirty-second aspect, the coding band calculation unit employs as the function making the functional relation, a function having weighting in consideration of psychoacoustic characteristics of human beings, such as a Bark scale and Mel coefficients. Therefore, high-quality and high-efficiency adaptive scalable coding in consideration of the psychoacoustic characteristics of human beings is realized.

According to a thirty-fifth aspect of the present invention, in the audio signal coding apparatus of the twenty-fourth aspect, the arrangement decision unit determines the arrangement of the bands to be coded by the respective encoders of each stage; and a plurality of patterns of arrangement of the respective encoders which are prepared in advance, are switched so as to improve the coding efficiency. Therefore, high-quality and high-efficiency adaptive scalable coding is realized in a relatively simple structure.

According to a thirty-sixth aspect of the present invention, in the audio signal coding apparatus of the twenty-fourth aspect, when the characteristic of the input audio signal is stationary, having no rapid changes, and the analysis scale is large, the arrangement decision unit has a small value as the maximum value of the band to be coded by the respective encoders of each stage. Therefore, when the input audio signal has stationary characteristic, high-quality and high-efficiency adaptive scalable coding, in which the low-band audio signal is audible, is realized.

According to a thirty-seventh aspect of the present invention, in the audio signal coding apparatus of the twenty-fourth aspect, a filter to be connected at a previous stage to the respective encoders is one of a low-pass filter, a high-pass filter, a band-pass filter, and a band-rejection filter, or a combination of two or more of these filters. Therefore, high-quality and high-efficiency adaptive scalable coding in consideration of the corresponding band is realized.

According to a thirty-eighth aspect of the present invention, in the audio signal decoding apparatus of the twenty-seventh aspect, the inverse quantization unit performs inverse quantization by using only part of the codes which are output from the audio signal coding apparatus. Therefore, it is possible to realize an audio signal decoding apparatus capable of decoding a coded signal output from an audio signal coding apparatus performing high-quality and high-efficiency adaptive scalable coding in a simple construction.

DETAILED DESCRIPTION OF THE PREFERRED EMBODIMENTS

Hereinafter, a first embodiment of the present invention will be described with reference to FIGS. 1 to 9, and a second embodiment of the present invention will be described with reference to FIGS. 14 to 20.

Embodiment 1

Figure 1:
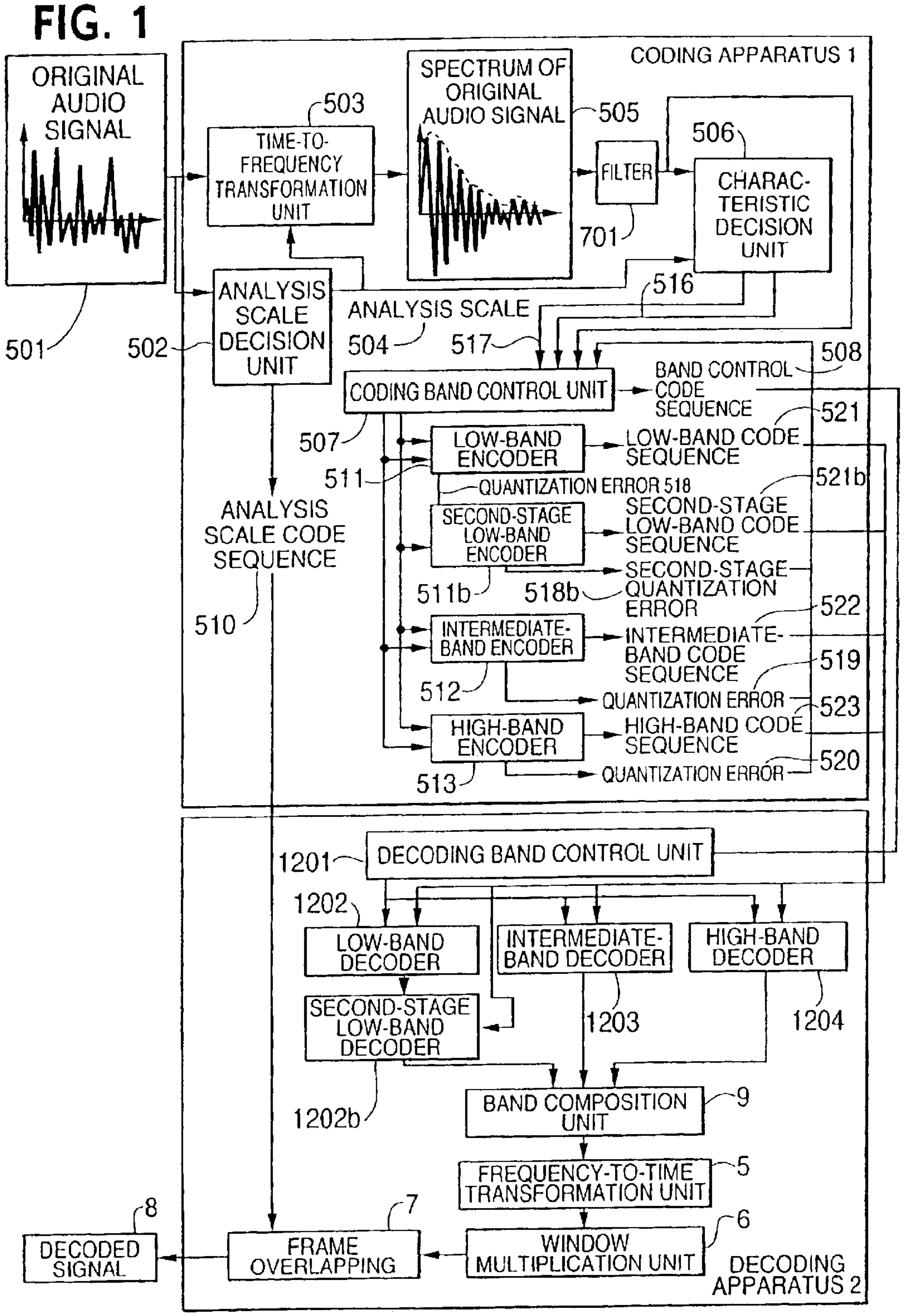
FIG. 1 is a block diagram illustrating an audio signal coding apparatus performing adaptive scalable coding, and a decoding apparatus adapted to the coding apparatus, according to a first embodiment of the present invention.

FIG. 1 is a block diagram illustrating an audio signal coding apparatus 1 performing adaptive scalable coding according to a first embodiment of the present invention.

In FIG. 1, reference numeral 1 denotes a coding apparatus for coding an original audio signal 501. In the coding apparatus 1, numeral 502 denotes an analysis scale decision unit which decides an analysis scale 504 for analyzing the original audio signal 501; numeral 503 denotes a time-to-frequency transformation unit which transforms the time axis of the original audio signal 501 to the frequency axis in units of the analysis scales 504; numeral 504 denotes the analysis scale decided by the analysis scale decision unit 502; numeral 505 denotes the spectrum of the original audio signal; numeral 701 denotes a filter to which the spectrum 505 of the original audio signal is input; numeral 506 designates a characteristic decision unit which decides the characteristic of the spectrum 505 of the original audio signal to decide the frequency band of the audio signals to be quantized by multiple-stages of encoders 511, 512, 513, 511*b*, . . . included in the coding apparatus 1; numeral 507 designates a coding band control unit which receives the frequency bands of the respective encoders decided by the characteristic decision unit 506, and the time-to-frequency transformed audio signal, decides the connecting order of the multiple-stages of encoders 511, 512, 513, 514, 511*b*, . . . , and transforms the quantization bands of the respective encoders and the connecting order to code sequences; numeral 508 denotes a band control code sequence as the code sequence output from the coding band control unit 507; numeral 510 denotes an analysis scale code length which is a code sequence of the analysis scale output from the analysis scale decision unit 502; numerals 511, 512, and 513 denote a low-band encoder, an intermediate-band encoder, and a high-band encoder for coding signals in low-band, intermediate-band, and high-band, respectively; numeral 511*b* denotes a second-stage low-band encoder for coding a quantization error 518 of the first-stage low-band encoder 511; numerals 521, 522 and 523 denote a low-band code sequence, an intermediate-band code sequence, and a high-band code sequence as coded signals output from the encoders 511, 512 and 513, respectively; numeral 521*b* denotes a second-stage low-band code sequence which is the output from the second-stage low-band encoder 511*b*; numerals 518, 519 and 520 denote quantization differences corresponding to differences between signals which have not yet been coded and signals which have already been coded, respectively output from the encoders 511, 512 and 513; and numeral 518*b* denotes a second-stage quantization error output from the second-stage low-band encoder 511*b*.

On the other hand, reference numeral 2 denotes a decoding apparatus for decoding the code sequences obtained in the coding apparatus 1. In the decoding apparatus 2, numeral 5 denotes a frequency-to-time transformation unit which performs inverse transformation of that of the time-to-frequency transformation unit 503; numeral 6 denotes a window multiplication unit which multiplies an input by a window function on the time axis; numeral 7 denotes a frame overlapping unit; numeral 8 denotes a coded signal; numeral 9 denotes a band composition unit; numeral 1201 denotes a decoding band control unit; numerals 1202, 1203 and 1204 denote a low-band decoder, an intermediate-band decoder, and a high-band decoder which perform decoding adaptively to the low-band encoder 511, the intermediate-band encoder 512, and the high-band encoder 513, respectively; and numeral 1202*b* denotes a second-stage low-band decoder which decodes the output of the first-stage low-band decoder 1202.

In the above-described structure, the encoders (decoders) subsequent to the first-stage encoder (decoder) may be arranged for more bands or in more stages other than mentioned above. As the number of the stages of encoders (decoders) increases, the accuracy of coding (decoding) is improved as desired.

A description is now given of the operation of the coding apparatus 1.

It is assumed that an original audio signal 501 to be coded is a digital signal sequence which is temporally continuous. For example, it is a digital signal obtained by quantizing an audio signal to 16 bits at a sampling frequency of 48 kHz.

The original audio signal 501 is input to the analysis scale decision unit 502. The analysis scale decision unit 502 investigates the characteristics of the original audio signal to decide the analysis scale 504, and the result is sent to the decoding apparatus 1002 as the analysis scale code sequence 510. For example, 256, 1024, or 4096 is used as the analysis scale 504. When the high-frequency component included in the original audio signal 501 exceeds a predetermined value, the analysis scale 504 is decided to be 256. When the low-frequency component exceeds a predetermined value and the high-frequency component is smaller than a predetermined value, the analysis scale 504 is decided to be 4096. In the cases other than mentioned above, the analysis scale 504 is decided to be 1024. According to the analysis scale 504 so decided, the time-to-frequency transformation unit 503 calculates a spectrum 505 of the original audio signal 501.

Figure 2:
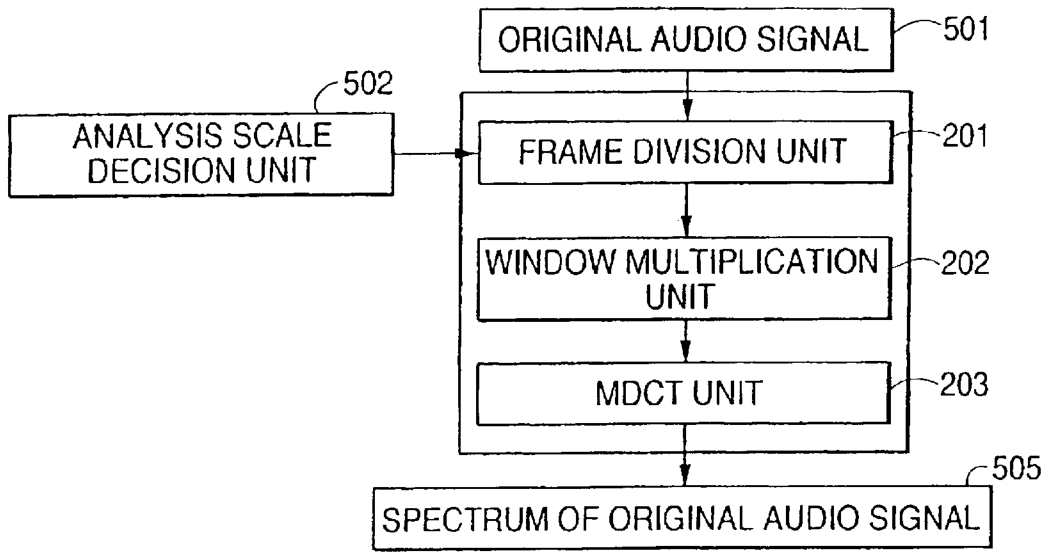
FIG. 2 is a block diagram illustrating a time-to-frequency transformation unit included in the coding apparatus of the first embodiment.

FIG. 2 is a block diagram illustrating the time-to-frequency transformation unit 503 in more detail.

The original audio signal 501 is accumulated in a frame division unit 201 until reaching a predetermined sample number. When the number of accumulated samples reaches the analysis scale 504 decided by the analysis scale decision unit 502, the frame division unit 201 outputs the samples. Further, the frame division unit 201 outputs the samples for every shift length which has previously been specified. For example, in the case where the analysis scale 504 is 4096 samples, when the shift length is set at half the analysis scale 504, the frame division unit 201 outputs the latest 4096 samples every time the analysis scale 504 reaches 2048 samples. Of course, even when the analysis scale 504 or the sampling frequency varies, the shift length can be set at half the analysis scale 504.

The output from the frame division unit 201 is input to a window multiplication unit 202 in the subsequent stage. In the window multiplication unit 202, the output from the frame division unit 201 is multiplied by a window function on time axis, and the result is output from the window multiplication unit 102. This operation is expressed by formula (1).

$$hxi = h_i * x_i \quad i = 1, 2, \ldots, N \tag{1}$$

$$h_i = \sin\left\{\frac{\pi}{N}(i + 0.5)\right\}$$

where $x_i$ is the output from the frame division unit 201, $h_i$ is the window function, and hxi is the output from the window multiplication unit 202. Further, i is a suffix for time. The window function hi shown in formula (1) is merely an example, and the window function is not restricted to that of formula (1).

Selection of the window function depends on the feature of the signal input to the window multiplication unit 202, the analysis scale 504 of the frame division unit 201, and the shapes of window functions in frames which are positioned temporally before and after the frame being processed. For example, the window function is selected as follows. When assuming that the analysis scale 504 of the frame division unit 201 is N, the feature of the signal input to the window multiplication unit 202 is such that the average power of signals which is calculated at every N/4 varies significantly, the analysis scale 504 is made smaller than N, followed by the operation of formula (1). Further, it is desirable that the window function is appropriately selected in accordance with the shape of the window function of a frame in the past and the shape of the window function of a frame in the future, so that the shape of the window function of the present frame is not distorted.

Next, the output from the window multiplication unit 202 is input to an MDCT unit 203, wherein the output is subjected to modified discrete cosine transform (MDCT) to output MDCT coefficients. The modified discrete cosine transform is generally represented by formula (2).

$$y_k = \sum_{n=0}^{N-1} hx_n * \cos\left\{\frac{2\pi\left(k+\frac{1}{2}\right)(n+n_0)}{N}\right\} \tag{2}$$

$$n_0 = \frac{N}{4} + \frac{1}{2}\ \left(k = 0, 1, \ldots, \frac{N}{2} - 1\right)$$

Assuming that the MDCT coefficients output from the MDCT unit 203 are represented by $y_k$ in formula (2), those MDCT coefficients represent the frequency characteristics, and the frequency characteristics linearly correspond to lower frequency components as the variable k of $y_k$ approaches closer to 0, and correspond to higher frequency components as the variable k approaches closer to N/2−1, increasing from 0. The MDCT coefficients so calculated are represented by the spectrum 505 of the original audio signal.

Next, the spectrum 505 of the original audio signal is input to a filter 701. Assuming that the input to the filter 701 is $x_{701}(i)$ and the output of the filter 701 is $y_{701}(i)$, the filter 701 is expressed by formula (3).

$$y_{701}(i)=w_{701}(i)*\{x_{701}(i)+x_{701}(i+1)\}$$

$$i=0, 1, \ldots, fs-2 \tag{3}$$

wherein fs is the analysis scale 504.

The filter 701 expressed by formula (3) is a kind of moving average filter. However, the filter 701 is not restricted to a moving average filter. Other filters, such as a high-pass filter or a band-rejection filter, may be used.

Figure 6:
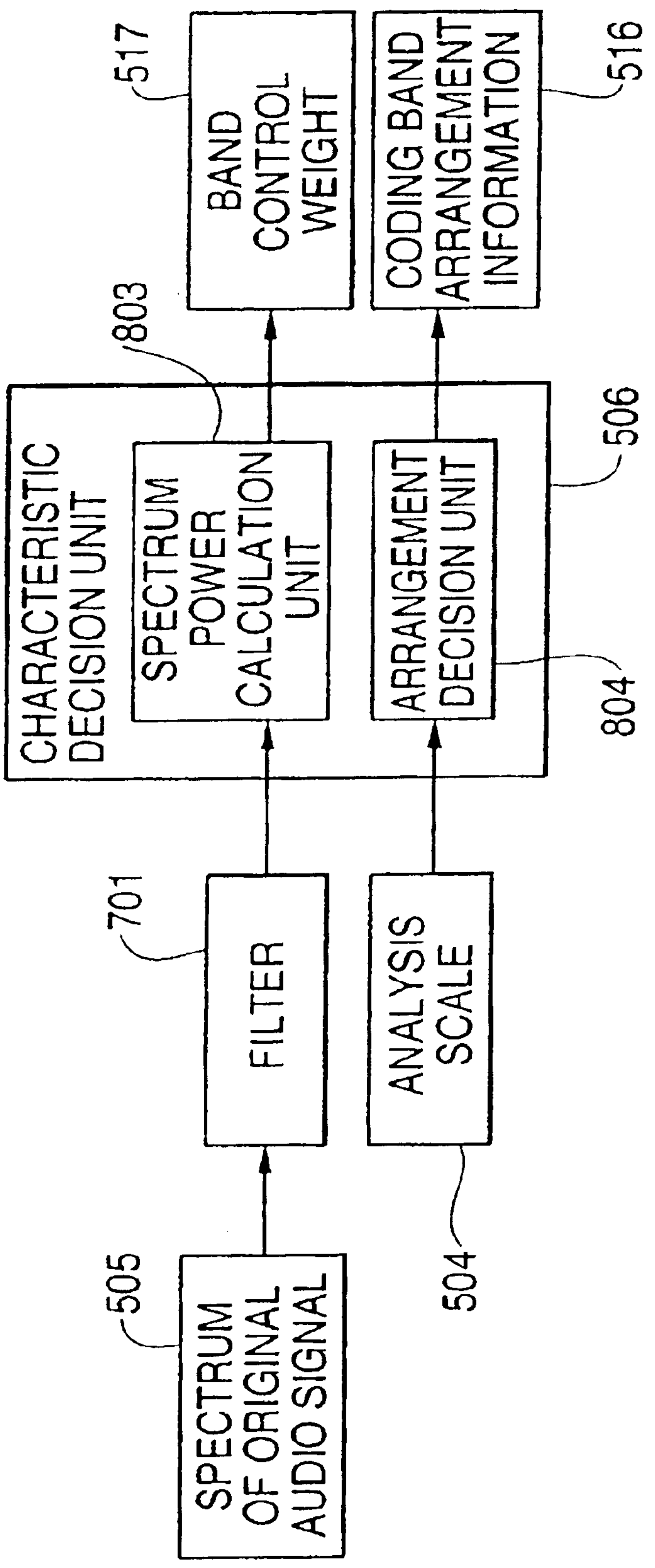
FIG. 6 is a block diagram illustrating a characteristic decision unit in the coding apparatus of the first embodiment.

The output of the filter 701 and the analysis scale 504 calculated in the analysis scale decision unit 502 are input to a characteristic decision unit 506. FIG. 6 shows the characteristic decision unit 506 in detail. In the characteristic decision unit 506, acoustic and physical characteristics of the original audio signal 501 and those of the spectrum 505 of the original audio signal 501 are decided. The acoustic and physical characteristics of the original audio signal 501 and those of the spectrum 505 are, for example, a distinction between voice and music. In case of voice, the greater part of frequency components are included in bands lower than 6 kHz, for example.

Next, the operation of the characteristic decision unit 506 will be described with reference to FIG. 6.

Assuming that a signal obtained by filtering the spectrum 505 of the original audio signal which is input to the characteristic decision unit 506 by the filter 701 is $x_{506}(i)$, a spectrum power $p_{506}(i)$ is calculated from $x_{506}(i)$ according to formula (4), in a spectrum power calculation unit 803.

$$p_{506}(i)=x_{506}(i)^2 \tag{4}$$

The spectrum power $p_{506}(i)$ is used as one input to a coding band control unit 507 described later and used as a band control weight 517.

When the analysis scale 504 is small (for example, 256), arrangement of the respective encoders is decided by an arrangement decision unit 804 such that the respective encoders are fixedly placed, and coding band arrangement information 516 indicating "fixed arrangement" is sent to a coding band control unit 507.

When the analysis scale 504 is not small (for example, 4096 or 1024), arrangement of the respective encoders is decided by the arrangement decision unit 804 such that the respective encoders are dynamically placed, and coding band arrangement information 516 indicating "dynamic arrangement" is sent to the coding band control unit 507.

Next, the operation of the coding band control unit 507 will be described with reference to FIG. 7.

The coding band control unit 507 receives the band control weight 517 output from the characteristic decision unit 506, the coding band arrangement information 516, the signal obtained by filtering the spectrum 505 of the original audio signal by using the filter 701, and the quantization error 518, 519, or 520 output from the encoder 511, 512, or 513. However, the coding band control unit 507 receives these inputs because the respective encoders 511, 512, 513, 511*b*, . . . and the coding band control unit 507 operate recursively. So, during the first-time operation of the coding band control unit 507, since no quantization error exists, the three inputs other than the quantization error are input to the coding band control unit 507.

When the analysis scale 504 is small and the coding band arrangement information 516 indicates "fixed arrangement", the quantization bands of encoders, the number of encoders, and the connecting order are decided by a quantization order decision unit 902, an encoder number decision unit 903, and a band width calculation unit 901, so that coding is executed in the order of low-band, intermediate-band, and high-band, according to fixed arrangement which has been defined in advance, followed by coding to generate a band control code sequence 508. In the band control code sequence 508, the band information, the number of encoders, and the connecting order of encoders are encoded as information.

For example, encoders are arranged such that the coding bands of the respective encoders and the number of the encoders are selected as follows: one encoder in 0 Hz~4 kHz, one encoder in 0 Hz~8 kHz, one encoder in 4 kHz~12 kHz, two encoders in 8 kHz~16 kHz, and three encoders in 16 kHz~24 kHz, followed by coding.

When the coding band arrangement information 516 indicates "dynamic arrangement", the coding band control unit 507 operates as follows.

Figure 7:
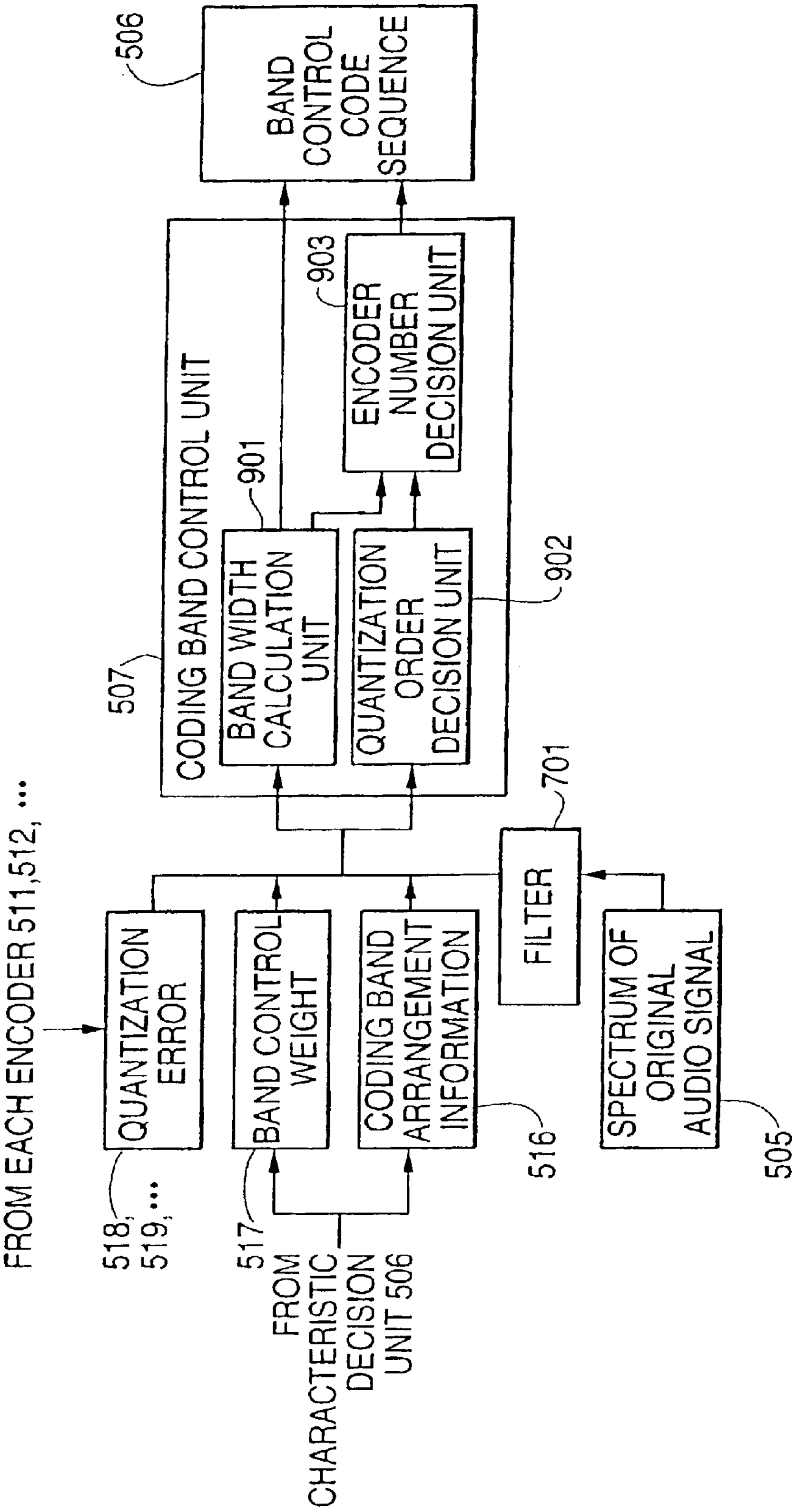
FIG. 7 is a block diagram illustrating a coding band control unit in the coding apparatus of the first embodiment.

As shown in FIG. 7, the coding band control unit 507 comprises a band width calculation unit 901 which decides the quantization band widths of the respective encoders, a quantization order decision unit 902 which decides the quantization order of the respective encoders, and an encoder number decision unit 903 which decides the number of encoders in each band. That is, the band widths of the respective encoders are decided according to the signals input to the coding band control unit 507. In each of predetermined bands (for example, 0 Hz~4 kHz, 0 Hz~8 kHz, 4 kHz~12 kHz, 8 kHz~16 kHz, and 16 kHz~24 kHz), the average of the results obtained by multiplying the band control weight 517 and the quantization error after coding of each encoder, is calculated. Assuming that the band control weight 517 is $weight_{517}(i)$, and the quantization error is $err_{507}(i)$, the average is calculated in formula (5).

$$Ave_{901}(j) = \frac{1}{f_{upper}(j) - f_{lower}(j)} \sum_{i=f_{upper}(j)}^{f_{lower}(j)} weight_{517}(i) * err_{507}(i)^2 \quad (5)$$

wherein j is an index for band, $Ave_{901}(j)$ is the average for band j, $f_{upper}(j)$ and $f_{lower}(j)$ are the upper-limit frequency and the lower-limit frequency for band j, respectively. Then, j at which the average $Ave_{901}(j)$ amounts to maximum is retrieved, and this j is the band to be coded by the encoder. Further, the retrieved j is sent to the encoder number decision unit 903 to increase the number of encoders in the band corresponding to j by one, and the number of encoders existing in the coding band is continued to be stored. Coding is repeated until the total sum of the stored encoder numbers reaches the overall sum of encoders which has been decided in advance. Finally, the bands of the encoders and the number of encoders for respective bands are transmitted to the decoder, as a band control code sequence 508.

Figure 3:
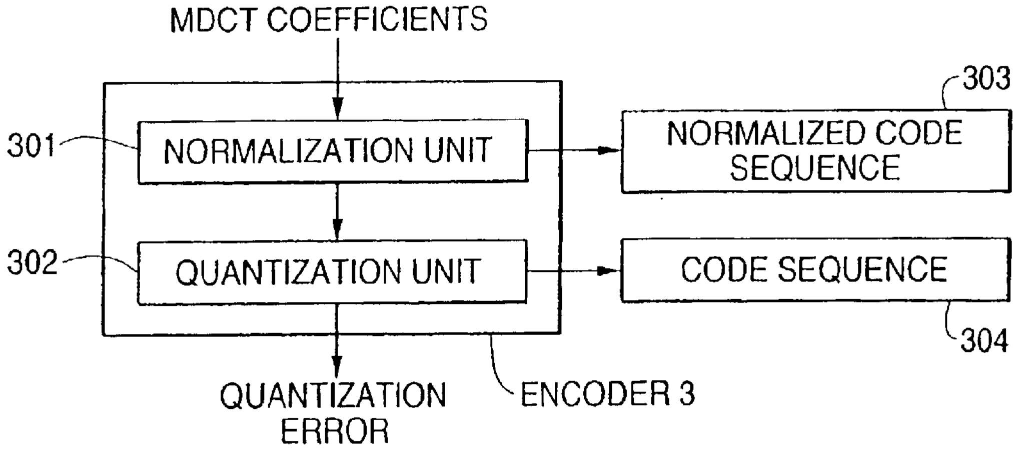
FIG. 3 is a diagram illustrating an encoder included in the coding apparatus of the first embodiment.

Next, the operation of an encoder 3 will be described with reference to FIG. 3.

The encoder 3 comprises a normalization unit 301 and a quantization unit 302.

The normalization unit 301 receives both of the signal on time-axis which is output from the frame division unit 201 and the MDCT coefficients which are output from the MDCT unit 203, and normalizes the MDCT coefficients by using some parameters. To normalize the MDCT coefficients means to suppress variations in values of the MDCT coefficients, which values are considerably different between the low-band components and the high-band components. For example, when the low-band component is extremely larger than the high-band component, a parameter which has a larger value in the low-band component and a smaller value in the high-band component is selected to divide the MDCT coefficients, thereby resulting in the MDCT coefficients with suppressed variations. Further, in the normalization unit 301, indices expressing the parameters used for the normalization are coded as a normalized code sequence 303.

The quantization unit 302 receives the MDCT coefficients normalized by the normalization unit 301 as inputs, and quantizes the MDCT coefficients. At this time, the quantization unit 302 outputs a code index having the smallest difference among the differences between the quantized values and the respective quantized outputs corresponding to plural code indices included in a code book. In this case, a difference between the value quantized by the quantization unit 302 and the value corresponding to the code index output from the quantization unit 203 is a quantization error.

Next, the normalization unit 301 will be described in more detail by using FIG. 4.

Figure 4:
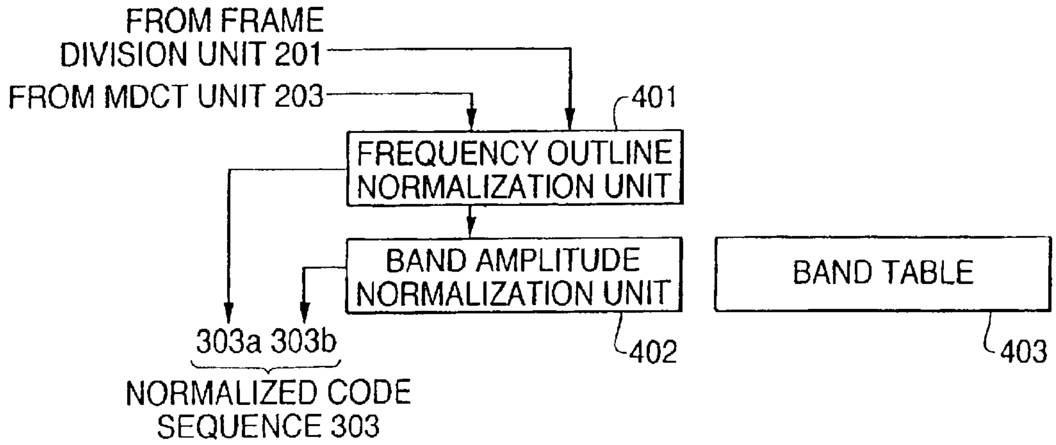
FIG. 4 is a block diagram illustrating a normalization unit included in the coding apparatus of the first embodiment.

In FIG. 4, reference numeral 401 denotes a frequency outline normalization unit which receives the output of the frame division unit 201 and the output of the MDCT unit 203, and numeral 402 denotes a band amplitude normalization unit which receives the output of the frequency outline normalization unit 401 and performs normalization with reference to a band table 403.

A description is given of the operation of the normalization unit 301.

The frequency outline normalization unit 401 calculates a frequency outline, i.e., a rough shape of frequency, by using the time-axis data output from the frame division unit 201, and divides the MDCT coefficients output from the MDCT unit 203. Parameters used for expressing the frequency outline are coded as a normalized code sequence 303. The band amplitude normalization unit 402 receives the output signal from the frequency outline normalization unit 401, and performs normalization for every band shown in the band table 403. For example, assuming that the MDCT coefficients output from the frequency outline normalization unit 401 are dct(i) (i=0~2047) and the band table 403 is shown by. [Table 1], the average of amplitudes in each band is calculated according to formula (6).

$$sum_j = \sum_{i=bjlow}^{bjhigh} dct(i)^p \quad (6)$$

$$ave_j = \left(\frac{sum_j}{bjhigh - bjlow + 1}\right)^{-p} \quad bjlow \le i \le bjhigh$$

where bjlow and bjhigh are the lowest-band index i and the highest-band index i, respectively, in which dct(i) in the j-th band shown in the band table 203 belongs. Further, p is the norm in distance calculation, and p is desired to be 2. Further, $ave_j$ is the average of amplitudes in each band A. The band amplitude normalization unit 402 quantizes $ave_j$ to obtain $qave_j$, and normalizes it according to formula (7).

$$n\ dct(i) = dct(i)/qave_j bjlow \leqq i \leqq bjhigh \quad (7)$$

To quantize $ave_j$, scalar quantization may be employed, or

TABLE 1

| band k | $f_{lower(k)}$ | $f_{upper(k)}$ |
|---|---|---|
| 0 | 0 | 10 |
| 1 | 11 | 22 |
| 2 | 23 | 33 |
| 3 | 34 | 45 |
| 4 | 46 | 56 |
| 5 | 57 | 68 |
| 6 | 69 | 80 |
| 7 | 81 | 92 |
| 8 | 93 | 104 |
| 9 | 105 | 116 |
| 10 | 117 | 128 |
| 11 | 129 | 141 |
| 12 | 142 | 153 |
| 13 | 154 | 166 |
| 14 | 167 | 179 |
| 15 | 180 | 192 |
| 16 | 193 | 205 |
| 17 | 206 | 219 |
| 18 | 220 | 233 |
| 19 | 234 | 247 |
| 20 | 248 | 261 |
| 21 | 262 | 276 |
| 22 | 277 | 291 |
| 23 | 292 | 307 |
| 24 | 308 | 323 |
| 25 | 324 | 339 |
| 26 | 340 | 356 |
| 27 | 357 | 374 |
| 28 | 375 | 392 |
| 29 | 393 | 410 |
| 30 | 411 | 430 |
| 31 | 431 | 450 |
| 32 | 451 | 470 |
| 33 | 471 | 492 |
| 34 | 493 | 515 |
| 35 | 516 | 538 |
| 36 | 539 | 563 |
| 37 | 564 | 587 |
| 38 | 589 | 615 |
| 39 | 616 | 643 |
| 40 | 645 | 673 |
| 41 | 674 | 705 |
| 42 | 706 | 737 |
| 43 | 738 | 772 |

TABLE 1-continued

| band k | $f_{lower(k)}$ | $f_{upper(k)}$ |
|---|---|---|
| 44 | 773 | 809 |
| 45 | 810 | 848 |
| 46 | 849 | 889 |
| 47 | 890 | 932 |
| 48 | 933 | 978 |
| 49 | 979 | 1027 |
| 50 | 1028 | 1079 |
| 51 | 1080 | 1135 |
| 52 | 1136 | 1193 |
| 53 | 1194 | 1255 |
| 54 | 1256 | 1320 |
| 55 | 1321 | 1389 |
| 56 | 1390 | 1462 |
| 57 | 1463 | 1538 |
| 58 | 1539 | 1617 |
| 59 | 1618 | 1699 |
| 60 | 1700 | 1783 |
| 61 | 1784 | 1870 |
| 62 | 1871 | 1958 |
| 63 | 1959 | 2048 |

vector quantization may be carried out by using the code book. The band amplitude normalization unit 402 codes the indices of parameters used to express $qave_j$, as a normalized code sequence 303.

Although the normalization unit 301 in the encoder comprises both of the frequency outline normalization unit 401 and the band amplitude normalization unit 402 as shown in FIG. 4, it may comprise only one of these units 401 and 402. Further, when there is no significant variations between the low-band components and the high-band components of the MDCT coefficients output from the MDCT unit 203, the output from the MDCT unit 203 may be directly input to the quantization unit 302 without using the units 401 and 402.

Figure 5:
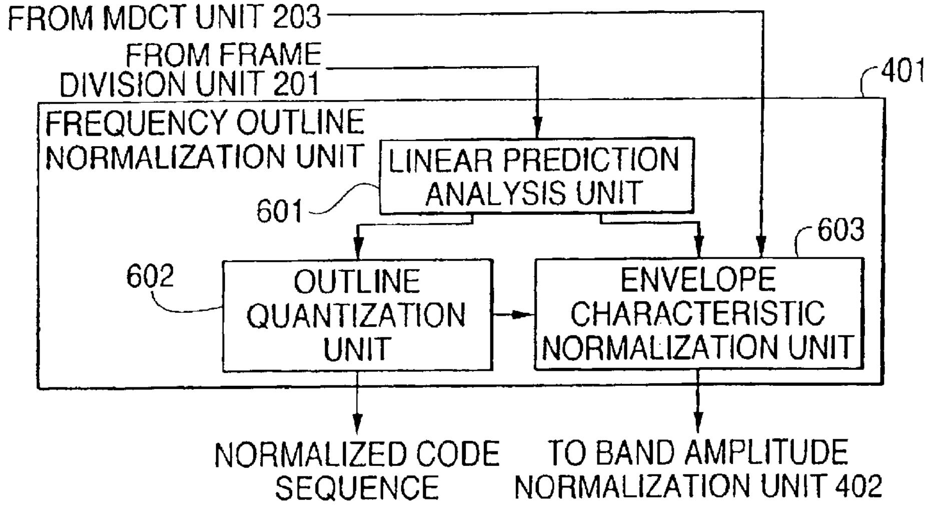
FIG. 5 is a frequency outline normalization unit in the coding apparatus of the first embodiment.

The frequency outline normalization unit 401 shown in FIG. 4 will be described in more detail by using FIG. 5. In FIG. 5, reference numeral 601 denotes a linear prediction analysis unit which receives the output from the frame division unit 201, numeral 602 denotes an outline quantization unit which receives the output from the linear prediction analysis unit 601, and numeral 603 denotes an envelope characteristic normalization unit which receives the output from the MDCT unit 203.

Next, the operation of the frequency outline normalization unit 401 will be described with reference to FIG. 5.

The linear prediction analysis unit 601 receives the time-axis audio signal output from the frame division unit 201, and subjects the signal to linear predictive coding (LPC). Generally, linear prediction coefficients (LPC coefficients) can be obtained by such as calculating an autocorrelation function of the signal which is window-multiplied by such as Humming window and solving a normalization equation. The LPC coefficients so calculated are transformed to line spectral pair coefficients (LSP coefficients) or the like to be quantized by the outline quantization unit 602. As a quantization method, vector quantization or scalar quantization may be employed. Then, frequency transfer characteristics expressed by the parameters quantized by the outline quantization unit 602 are calculated by the envelope characteristic normalization unit 603, and the MDCT coefficients output from the MDCT unit 203 are divided by the frequency transfer characteristics, thereby normalizing the MDCT coefficients. To be specific, assuming that the LPC coefficients equivalent to the parameters quantized by the outline quantization unit 602 are qlpc(i), the frequency transfer characteristics calculated by the envelope characteristic normalization unit 603 can be expressed by formula (8).

$$li = \begin{cases} qlpc(i) & 0 \le i \le \text{ORDER} \\ 0 & \text{ORDER} + 1 \le i \le N \end{cases} \tag{8}$$

$$env(i) = \frac{1}{fft(li)}$$

where ORDER is desired to be 10~40, and fft( ) means high-speed Fourier transformation. By using the frequency transfer characteristics env(i) so calculated, the envelope characteristic normalization unit 603 performs envelope characteristic normalization according to formula (9).

$$fdct(i) = \frac{mdct(i)}{env(i)} \tag{9}$$

where mdct(i) is the output signal from the MDCT unit 203, and fdct(i) is the normalized output signal from the envelope characteristic normalization unit 603.

Figure 8:
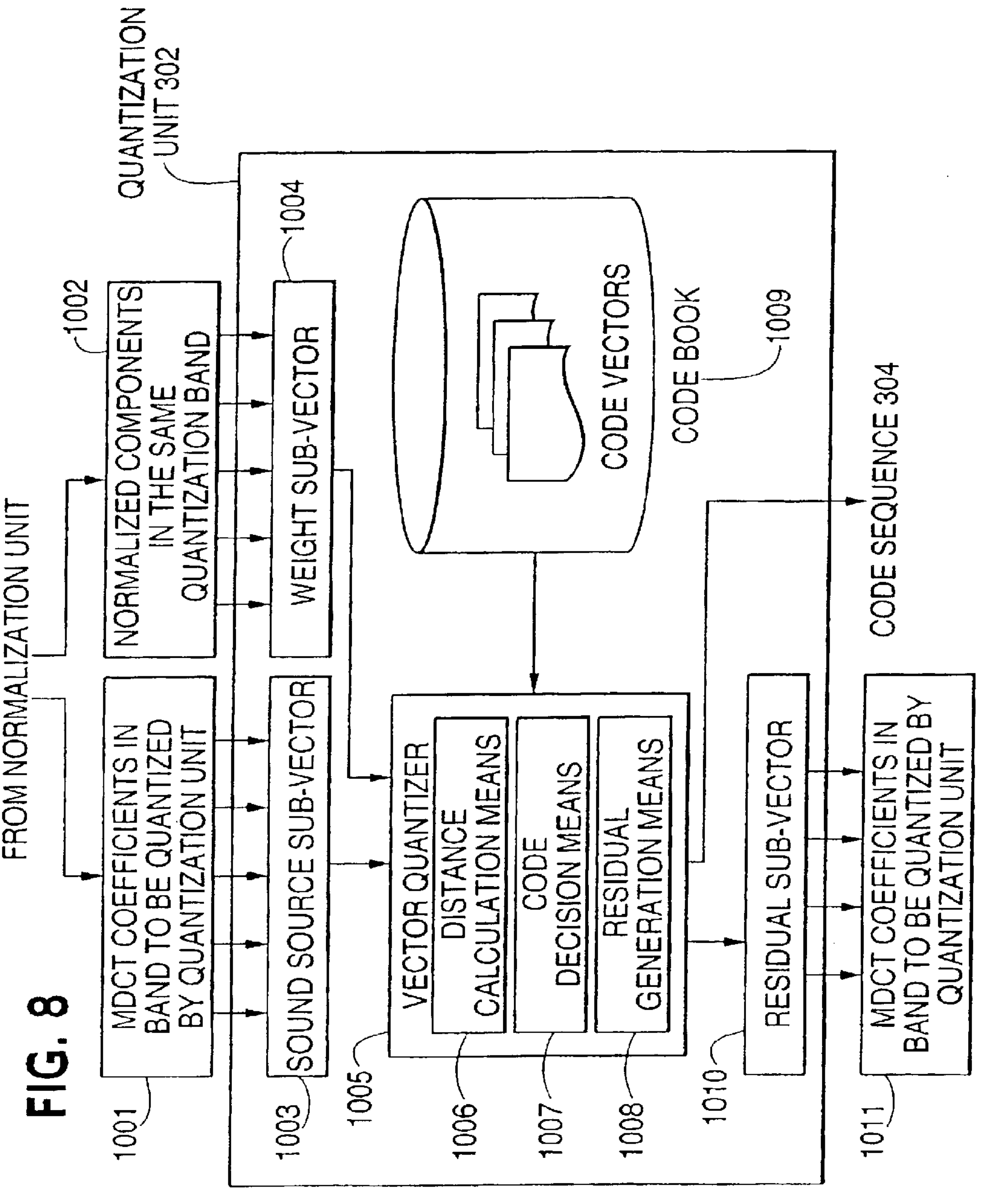
FIG. 8 is a block diagram illustrating a quantization unit in the coding apparatus of the first embodiment.

Next, the operation of the quantization unit 302 included in the encoder 3 will be described in detail by using FIG. 8.

Initially, some of the MDCT coefficients 1001 input to the quantization unit 302 are extracted to constitute a sound source sub-vector 1003. Assuming that coefficient sequences, which are obtained by dividing the MDCT coefficients input to the normalization unit 301 with the MDCT coefficients output from the normalization unit 301, are normalized components 1002, a sub-vector is extracted from the normalized components 1002 in accordance with the same rule as that for extracting the sound source sub-vector 1003 from the MDCT coefficients 1001, thereby providing a weight sub-vector 1004. The rule for extracting the sound source sub-vector 1003 (the weight sub-vector 1004) from the MDCT coefficients 1001 (the normalized components 1002) is represented by formula (10).

$$subvector_i(j) = \begin{cases} \text{vector}\left(\frac{VTOTAL}{CR} \cdot i + j\right) & \frac{VTOTAL}{CR} * i + j < \text{TOTAL} \\ 0 & \frac{VTOTAL}{CR} * i + j \ge \text{TOTAL} \end{cases} \tag{10}$$

where $subvector_i(j)$ is the j-th element of the i-th sound source sub-vector, vector ( ) is the MDCT coefficients 1001, TOTAL is the total element number of the MDCT coefficients 1001, CR is the element number of the sound source sub-vector 1003, and VTOTAL is a value equal to or larger than TOTAL, which value is set so that VTOTAL/CR takes an integer. For example, when TOTAL is 2048, CR is 19 and VTOTAL is 2052, or CR is 23 and VTOTAL is 2070, or CR is 21 and VTOTAL is 2079. The weight sub-vectors 1004 can be extracted according to the procedure of formula (10).

The vector quantizer 1005 searches the code vectors in the code book 1009 for a code vector having the shortest distance from the sound source sub-vector 1003, after being weighted by the weight sub-vector 1004. The vector quantizer 1005 outputs the index of the code vector having the shortest distance, and a residual sub-vector 1010 which corresponds to a quantization error between the code vector having the shortest distance and the input sound source sub-vector 1003.

An example of practical calculation procedure will be described on the premise that the vector quantizer 1005 is composed of a distance calculation means 1006, a code decision means 1007, and a residual generation means 1008.

The distance calculation means 1006 calculates the distance between the i-th sound source sub-vector 1003 and the k-th code vector in the code book 1009 by using formula (11).

$$dik = \sum_{j=0}^{CR-1} w_j^R (subvector_i(j) - C_k(j))^S \quad (11)$$

where $w_j$ is the j-th element of the weight sub-vector, $C_k(j)$ is the j-th element of the k-th code vector, and R and S are norms for distance calculation. The values of R and S are desired to be 1, 1.5, 2. These norms R and S may have different values. Further, dik is the distance of the k-th code vector from the i-th sound source sub-vector. The code decision means 1007 selects a code vector which has the shortest distance among the distances calculated by formula (11), and encodes the index of the selected code vector as a code sequence 304. For example, when diu is the smallest value among a plurality of dik, the index to be encoded with respect to the i-th sub-vector is u. The residual generation means.1008 generates the residual sub-vector 1010 by using the code vector selected by the code decision means 1007, according to formula (12).

$$res_i(j) = subvector_i(j) - C_u(j) \quad (12)$$

wherein $res_i(j)$ is the j-th element of the i-th residual sub-vector 1010, and $C_u(j)$ is the j-th element of the code vector selected by the code decision means 1007. Then, an arithmetic operation which is reverse to that of formula (10) is carried out by using the residual sub-vector 101 to obtain a vector, and a difference between this vector and the vector which has been the original target of coding by this encoder is retained as MDCT coefficients to be quantized in the subsequent encoders. However, when coding of some band does not influence on the subsequent encoders, i.e., when the subsequent encoders do not perform coding, it is not necessary for the residual generation means 1008 to generate the residual sub-vector 1010 and the MDCT coefficients 1011. Although the number of code vectors possessed by the code book 1009 is not specified, it is preferably about 64 when the memory capacity and the calculation time are considered.

As another example of the vector quantizer 1005, the following structure is available. That is, the distance calculation means 1006 calculates the distance by using formula (13).

$$dik = \begin{cases} \sum_{j=0}^{CR-1} w_j^R (subvector_i(j) - C_k(j))^S & k < K \\ \sum_{j=0}^{CR-1} w_j^R (subvector_i(j) - C_{K-k}(j))^S & k \geq K \end{cases} \quad (13)$$

wherein K is the total number of code vectors used for code retrieval on the code book 1009.

The code decision means 1007 selects k which gives the minimum value of the distance dik calculated in formula (13), and encodes the index thereof. Here, k takes any value from 0 to 2K−1. The residual generation means 1008 generates a residual sub-vector 1010 by using formula (14).

$$res_i(j) = \begin{cases} subvector_i(j) - C_u(j) & 0 \leq k < K \\ subvector_i(j) + C_u(j) & K \leq k < 2K \end{cases} \quad (14)$$

Although the number of code vectors possessed by the code book 1009 is not restricted, it is preferably about 64 when the memory capacity and the calculation time are considered.

Further, although the weight sub-vector 1004 is generated from the normalized components 1002 in the above-described structure, it is possible to generate a weight sub-vector by multiplying the weight sub-vector 1004 with a weight regarding the acoustic characteristics of human beings.

As described above, the band widths, number of encoders for each band, and connecting order of the encoders are dynamically decided. Quantization is carried out according to the information of the respective encoders so decided.

On the other hand, the decoding apparatus 2 performs decoding by using the normalized code sequences which are output from the encoders in the respective bands, the code sequences which are from the quantization units corresponding to the normalized code sequences, the band control code sequences which are output from the coding band control unit, and the analysis scale code sequences which are output from the analysis scale decision unit.

Figure 9:
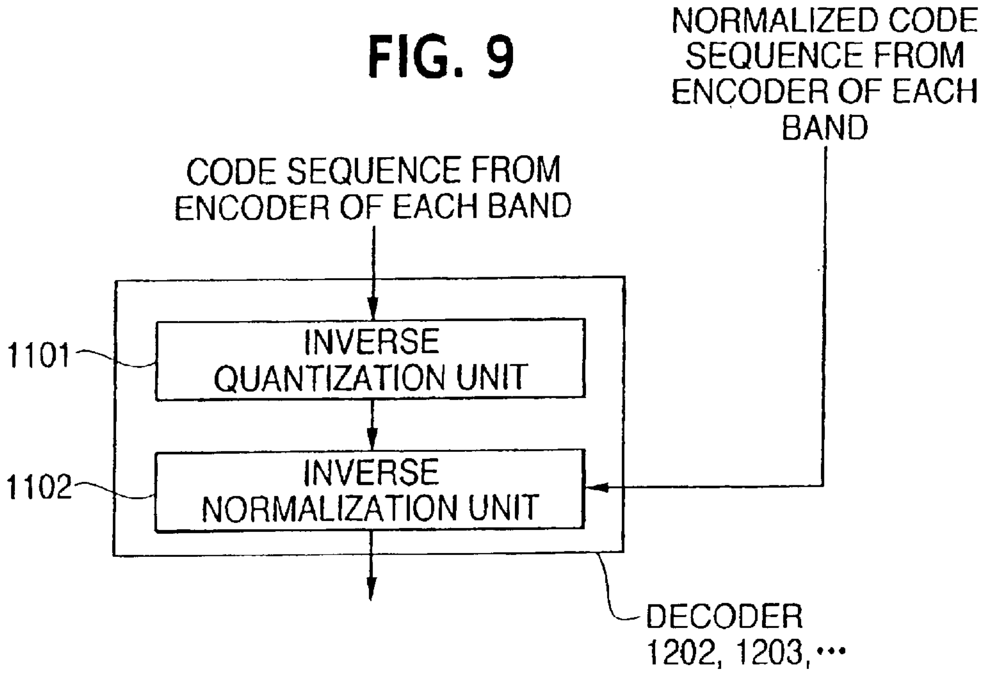
FIG. 9 is a block diagram illustrating a decoder included in the decoding apparatus of the first embodiment.

FIG. 9 shows the structure of the decoders 1202, 1203, or the like. Each decoder comprises an inverse quantization unit 1101 which reproduces normalized MDCT coefficients, and an inverse normalization unit 1102 which decodes normalization coefficients (parameters used for normalization) and multiplies the reproduced normalized MDCT coefficients by the normalization coefficients.

To be specific, in the inverse normalization unit 1102, parameters used for normalization in the coding apparatus 1 are reproduced from the normalized code sequence 303 output from the normalization unit in the encoding apparatus 1, and the output of the inverse quantization unit 1101 is multiplied by the parameters to reproduce the MDCT coefficients.

In the decoding band control unit 1201, information relating to the arrangement and number of the encoders used in the coding apparatus is reproduced by using the band control code sequence 508 which is output from the coding band control unit 507, and decoders are disposed in the respective bands, according to the information. Then, MDCT coefficients are obtained by a band composition unit 9 which arranges the bands in the reverse order of-the coding order of the respective encoders in the coding apparatus. The MDCT coefficients so obtained are input to a frequency-to-time transformation unit 5, wherein the MDCT coefficients are subjected to inverse MDCT to reproduce the time-domain signal from the frequency-domain signal. The inverse MDCT is represented by formula (15).

$$xx(n) = \frac{2}{N} \sum_{k=0}^{N-1} yy_k \cos\left\{\frac{2\pi(k+1/2)(n+n_0)}{N}\right\} \quad (15)$$

$$n_0 = \frac{N}{4} + \frac{1}{2}$$

where $yy_k$ is the MDCT coefficients reproduced in the band composition unit 9, and xx(n) is the inverse MDCT coefficients which are output from the frequency-to-time transformation unit 5.

The window multiplication unit 6 performs window multiplication by using the output xx(i) from the frequency-to-time transformation unit 5. This window multiplication is performed according to formula (16) by using the same window as that used by the time-to-frequency transformation unit 503 of the coding apparatus 1.

$$z(i)=xx(i)*h_i \quad (16)$$

where z(i) is the output of the window multiplication unit 6.

The frame overlapping unit 7 reproduces the audio signal by using the output from the window multiplication unit 6. Since the output from the window multiplication unit 6 is a temporally overlapped signal, the frame overlapping unit 7 generates an output signal 8 of the decoding apparatus 2, by using formula (17).

$$out_m(i)=z_m(i)+z_{m-1}(i+SHIFT) \quad (17)$$

wherein $z_m(i)$ is the i-th output signal z(i) of the window multiplication unit 6 in the m-th time frame, $z_{m-1}(i)$ is the i-th output signal of the window multiplication unit 6 in the (m−1)th time frame, SHIFT is the sample number corresponding to the analysis scale of the coding apparatus, and $out_m(i)$ is the output signal of the decoding apparatus 2 in the m-th time frame of the frame overlapping unit 7.

In this first embodiment, the quantizable frequency range calculated by the band width calculation unit 901 included in the coding band control unit 507 may be restricted by the analysis scale 504 as described hereinafter.

For example, when the analysis scale 504 is 256, the lower and upper limits of the quantizable frequency range of each encoder are set at about 4 kHz and 24 kHz, respectively. When the analysis scale 504 is 1024 or 2048, the above-mentioned lower and upper limits are set at 0 Hz and about 16 kHz, respectively. Further, once the analysis scale 504 has become 256, for a predetermined period after that (e.g., about 20 msec), the quantizable frequency range of each quantizer and the arrangement of the quantizers may be fixed under the control of the quantization order decision unit 902. Thereby, the arrangement of the quantizers is fixed timewise, and occurrence of acoustic egress and ingress of voice bands (i.e., acoustic sense such that a voice which has mainly been in a high band changes, in a moment, to a voice in a low band) is suppressed.

As described above, the audio signal coding apparatus according to the first embodiment is provided with the characteristic judgement unit which decides the frequency band of an audio signal to be quantized by each encoder of multiple-stage encoders; and the coding band control unit which receives the frequency band decided by the characteristic decision unit and the time-to-frequency transformed original audio signal, decides the order of connecting the respective encoders, and transforms the quantization bands of the encoders and the connecting order to code sequences, thereby implementing adaptive scalable coding. Therefore, it is possible to provide an audio signal coding apparatus which performs high quality and high efficiency adaptive scalable coding with sufficient performance for various audio signals, and a decoding apparatus which can decode the coded audio signals.

Embodiment 2

Hereinafter, a second embodiment of the present invention will be described by using FIGS. 14 to 20.

Figure 14:
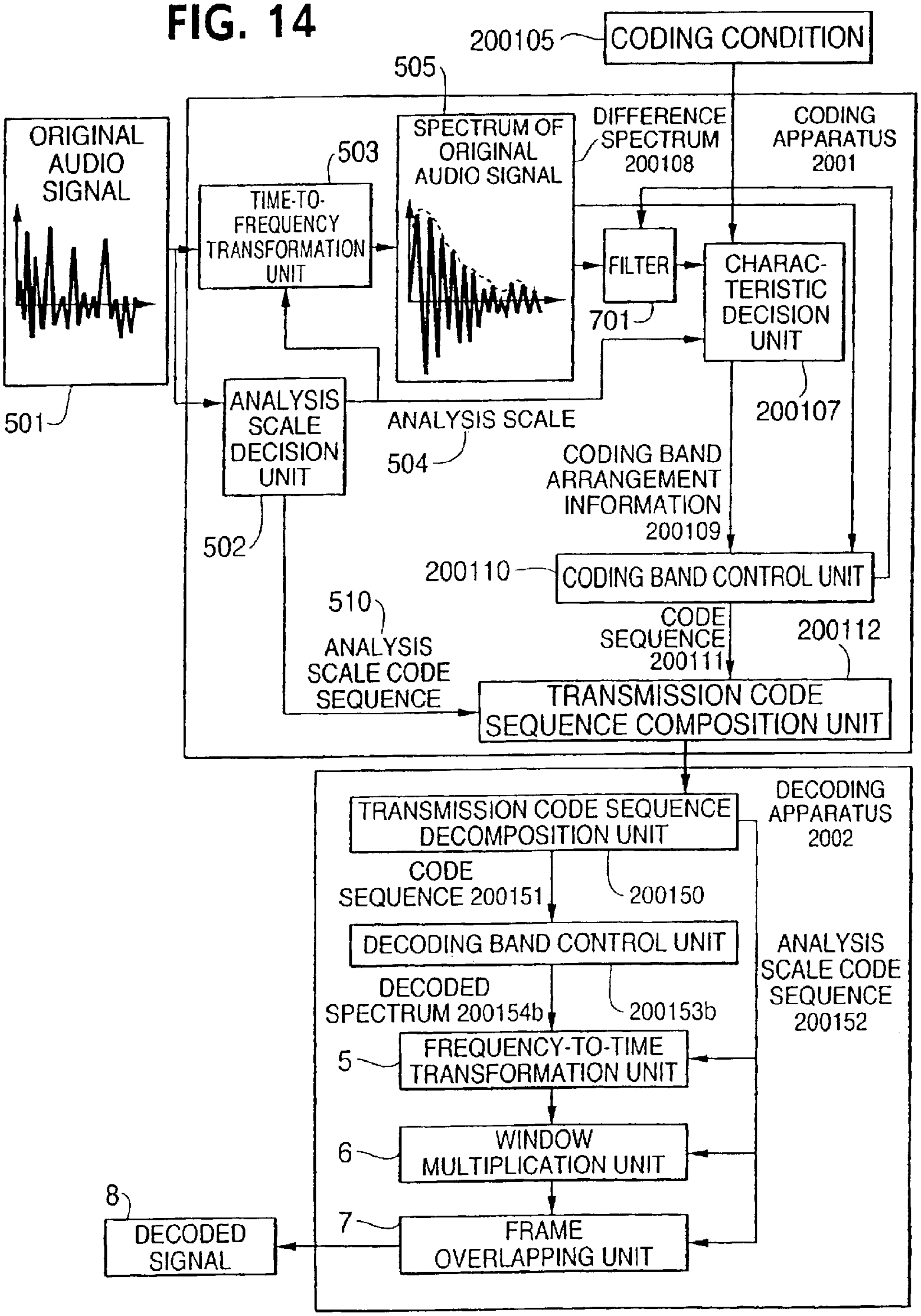
FIG. 14 is a block diagram illustrating an audio signal coding apparatus performing adaptive scalable coding, and a decoding apparatus adapted to the coding apparatus, according to a second embodiment of the present invention.

FIG. 14 is a block diagram illustrating a coding apparatus 2001 performing adaptive scalable coding, and a decoding apparatus 2002 adapted to the coding apparatus 2001, according to the second embodiment of the present invention. In the coding apparatus 2001, reference numeral 200105 denotes coding conditions, such as the number of encoders, the bit rate, the sampling frequency of an input audio signal, and the coding band information of each encoder; numeral 200107 denotes a characteristic decision unit which decides the frequency bands of audio signals to be quantized by multiple-stages of encoders; numeral 200109 denotes coding band arrangement information; numeral 200110 denotes a coding band control unit which receives the frequency bands decided by the characteristic decision unit 200107 and the time-to-frequency transformed audio signal, and transforms the quantization bands of the respective encoders and the connecting order of the encoders to a code sequence 200111; and numeral 200112 denotes a transmission code sequence composition unit. Further, in the decoding apparatus 2002, reference numeral 200150 denotes a transmission code sequence decomposition unit; numeral 200151 denotes a code sequence; numeral **200153*b* denotes a decoding band control unit which receives the code sequence 200151 and controls the decoding bands of decoders for decoding the code sequence 200151; and numeral 200154*b* denotes a decoded spectrum. The coding apparatus 2001 of this second embodiment performs adaptive scalable coding, like the coding apparatus 1001 of the first embodiment. However, the coding apparatus 2001 is different from the coding apparatus 1001 in the following points. The coding band control unit 200110 in the coding apparatus 2001 includes a decoding band control unit 200153, and the decoding apparatus 2002 includes a decoding band control unit 200153*b* identical to the decoding band control unit 200153. Furthermore, the spectrum power calculation unit 803 in the characteristic decision unit 506 of the first embodiment is replaced with a psychoacoustic model calculation unit 200602. Moreover, the characteristic decision unit 200107 includes a coding band arrangement information generation means 200604 which generates coding band arrangement information 200109 in accordance with the coding conditions 200105, the coding band information 200702 output from the coding band calculation unit 200601, and the band number 200606 output from the arrangement decision unit 200603**.

Next, the operation of the coding apparatus 2001 will be described.

It is assumed that an original audio signal 501 to be coded by the coding apparatus 2001 is a digital signal sequence which is temporally continuous.

Initially, the spectrum 505 of the original audio signal 501 is obtained by the same process as described for the first embodiment. In this second embodiment, the coding conditions 200105 including the number of encoders, the bit rate, the sampling frequency of the input audio signal, and the coding band information of the respective encoders, are input to the characteristic decision unit 200107 of the coding apparatus 2001. The characteristic decision unit 200107 outputs the coding band arrangement information 200109 including the quantization bands of the respective encoders and the connecting order thereof, to the coding band control unit 200110. The coding band control unit 200110 receives the coding band arrangement information 200109 and the spectrum 505 of the original audio signal, and performs encoding on the basis of these inputs by encoders under control by the control unit 200110, thereby providing the code sequence 200111. The code sequence 200111 is input to the transmission code sequence composition unit 200112 to be composited, and the composite output is sent to the decoding apparatus 2002.

In the decoding apparatus 2002, the output of the transmission code sequence composition unit 2001 is received by the transmitted code sequence decomposition unit 200150 to be decomposed to the code sequence 200151 and the analysis scale code sequence 200152. The code sequence 200151 is input to the decoding band control unit 200153*b*, and decoded by decoders under control by the control unit 200153*b*, thereby providing the decoded spectrum 200154*b*. Then, based on the decoded spectrum 200154*b* and the analysis scale code sequence 200152, the decoded signal 8 is obtained by using the frequency-to-time transformation unit 5, the window multiplication unit 6, and the frame overlapping unit 7.

Figure 16:
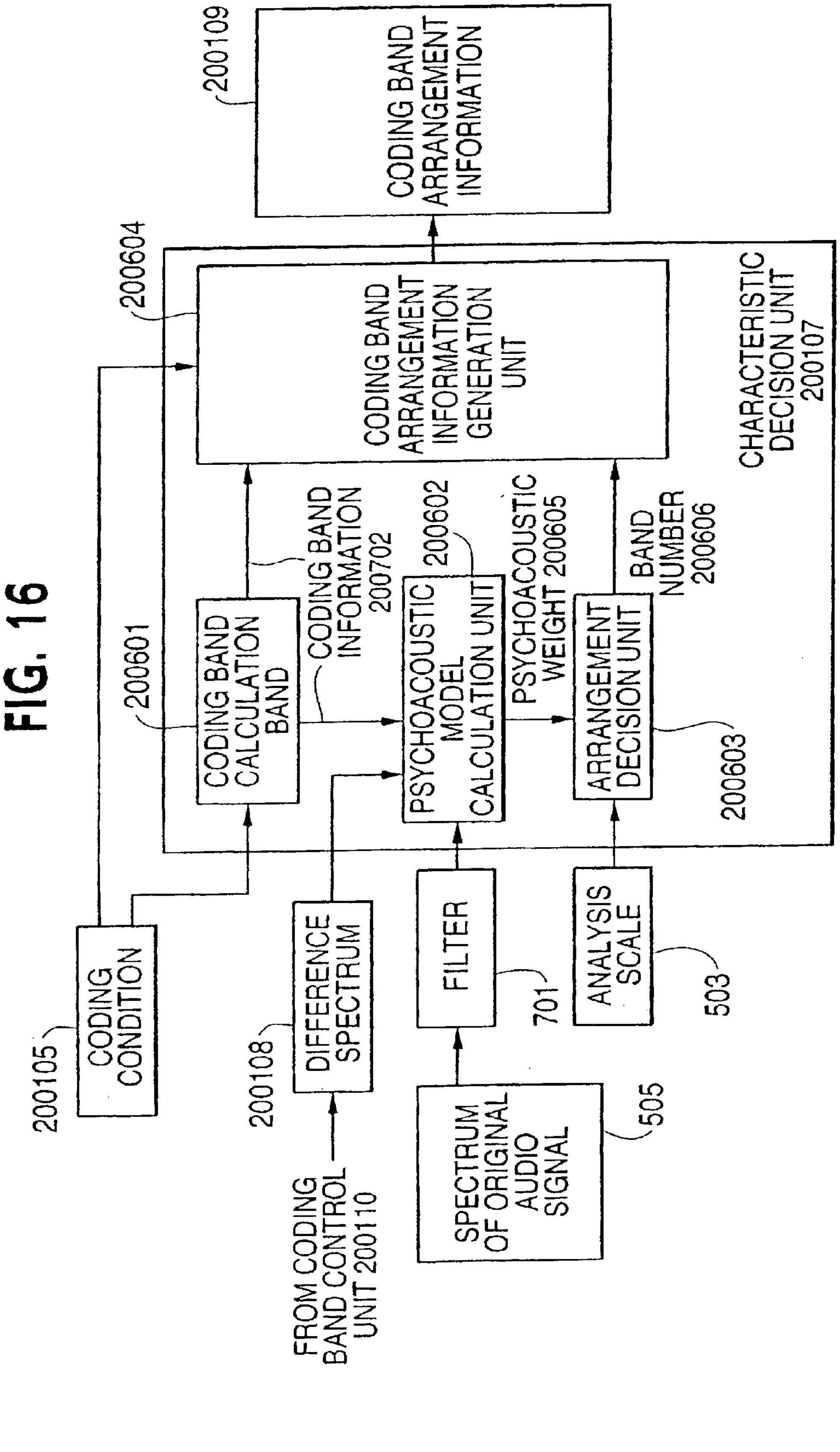
FIG. 16 is a block diagram illustrating a characteristic decision unit in the coding apparatus of the second embodiment.

Next, the operation of the characteristic decision unit 200107 will be described by using FIG. 16.

The characteristic decision unit 200107 comprises the coding band calculation unit 200601 which calculates the coding band arrangement information 200702 by using the coding conditions 200105; the psychoacoustic model calculation unit 200602 which calculates a psychoacoustic weight 200605, based on psychoacoustic characteristics of human beings, from the spectrum information such as the spectrum 505 of the original audio signal or the difference spectrum 200108, and the coding band information 200702; the arrangement decision unit 200603 which with weighting on the psychoacoustic weight 200605 with reference to the analysis scale 503 decides the arrangement of the bands of the respective encoders, and outputs the band number 200606; and the coding band arrangement information generation unit 200604 which generates the coding band arrangement information 200109, from the coding conditions 200105, the coding band information 200702 output from the coding band calculation unit 200601, and the band number 200606 output from the arrangement decision unit 200603.

Figure 15:
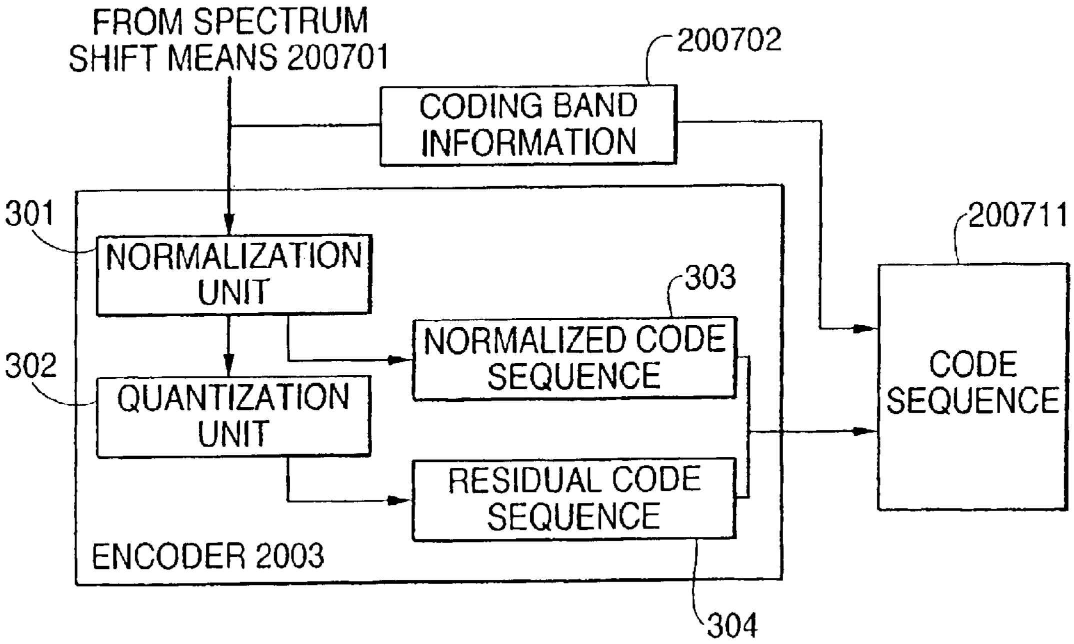
FIG. 15 is a block diagram illustrating an encoder included in the coding apparatus of the second embodiment.
Figure 10:
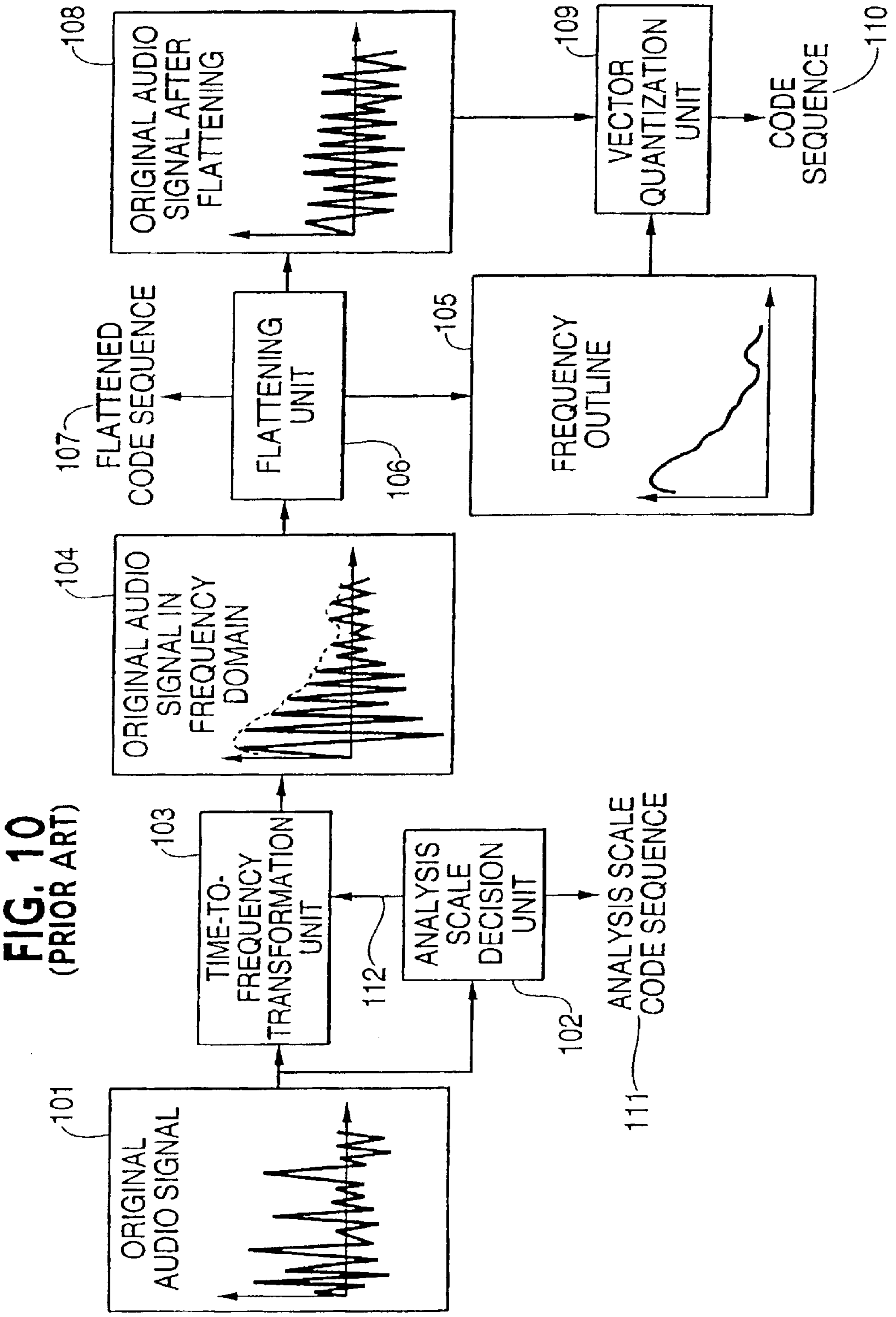
FIG. 10 (PRIOR ART)
FIG. 10 is a diagram for explaining the outline of general Twin VQ.
Figure 11:
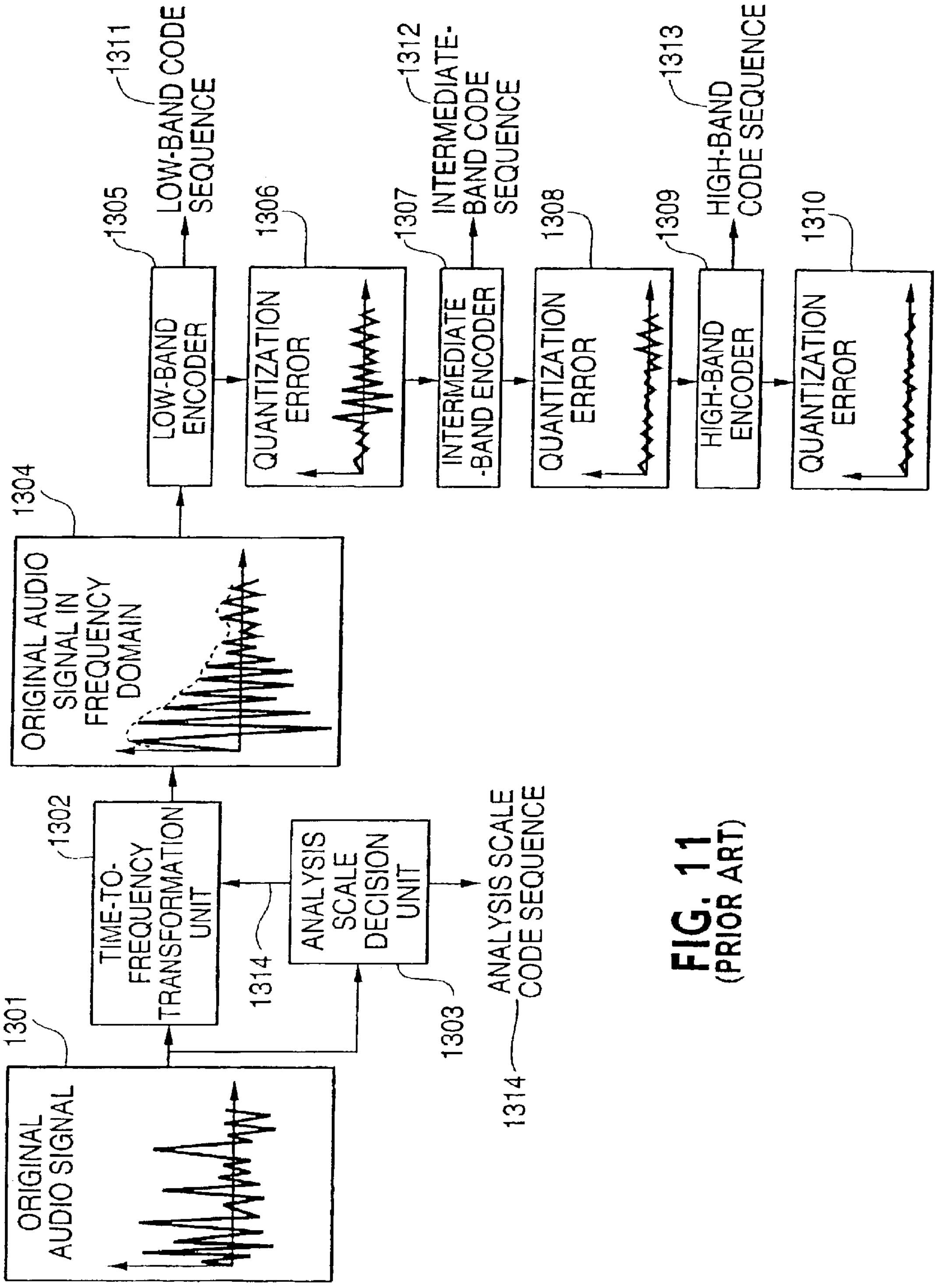
FIG. 11 (PRIOR ART)
FIG. 11 is a diagram for explaining general Twin VQ scalable coding.
Figure 12:
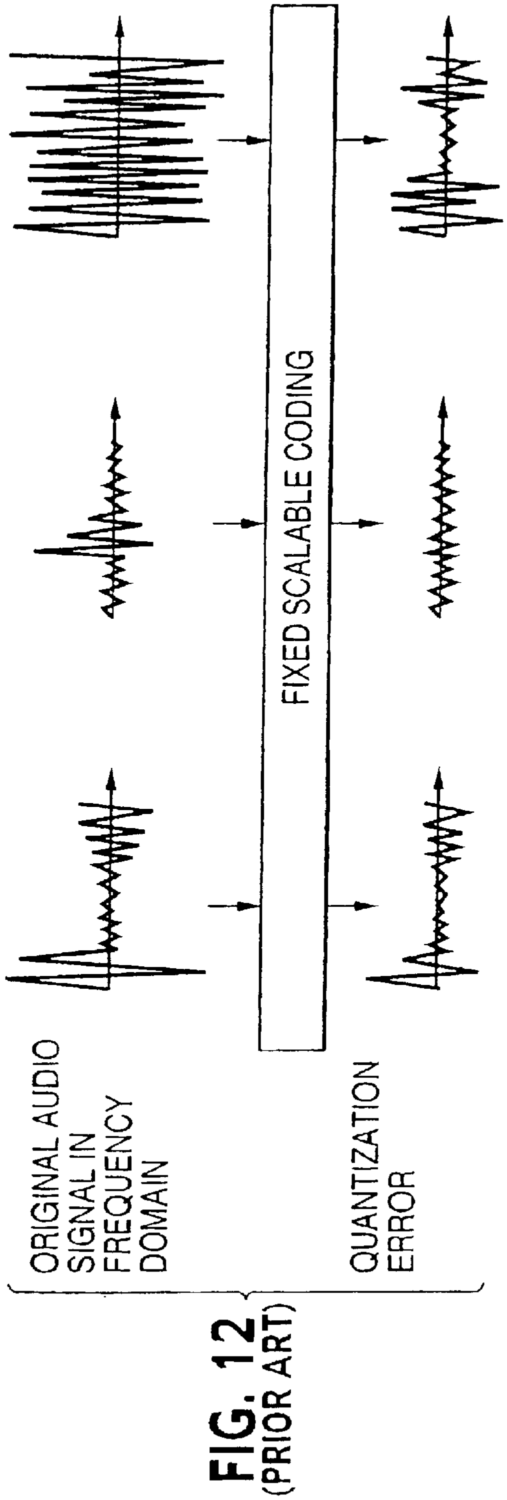
FIG. 12 (PRIOR ART)
FIG. 12 is a diagram for explaining the disadvantage of general fixed scalable coding.
Figure 13:
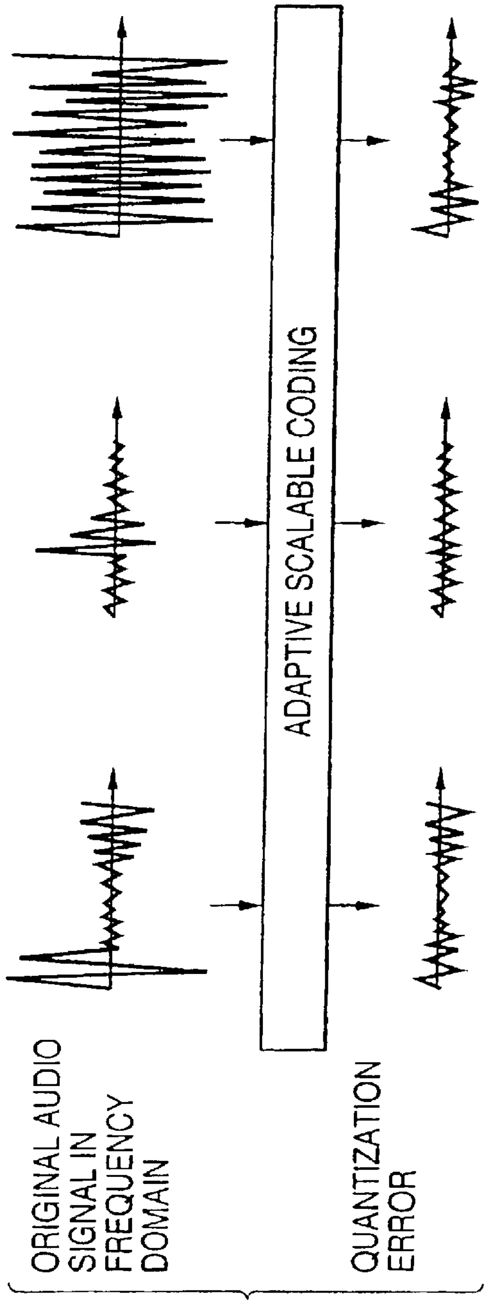
FIG. 13 is a diagram for explaining the advantage of generate adaptive scalable coding.

The coding band calculation unit 200601 calculates the upper limit fpu(k) and the lower limit fpl(k) of the coding-band which is to be coded by the encoder 2003 shown in FIG. 15 by using the coding condition 200105 which has been set before the coding apparatus 2001 starts operation. The upper and lower limits are sent to the coding band arrangement information generation unit 200604, as coding band information 200702. Here, k indicates the number for handling the coding band and, as the k approaches from 0 closer to the maximum number pmax which has previously been set, it indicates a higher-frequency band. For example, pmax is 4. An example of operation of the coding band calculation unit 200601 is shown in Table 2.

TABLE 2

| band k | fpu (k) | fpl (k) |
|---|---|---|
| 0 | 221 | 0 |
| 1 | 318 | 222 |
| 2 | 415 | 319 |
| 3 | 512 | 416 |
| coding condition: | sampling frequency = 48 kHz, total bit rate = 24 kbps | |
| 0 | 443 | 0 |
| 1 | 637 | 444 |
| 2 | 831 | 638 |
| 3 | 1024 | 832 |
| coding condition: | sampling frequency = 24 kHz, total bit rate = 24 kbps | |

The psychoacoustic model calculation unit 200602 calculates a psychoacoustic weight 200605, based on psychoacoustic characteristics of human beings, from the spectrum information such as the output signal from the filter 701 or the difference spectrum 200108 output from the coding band control unit 200110, and the coding band information 200702 output from the coding band calculation unit 200601. The psychoacoustic weight 200605 has a relatively large value for a band which is psychoacoustically important, and a relatively small value for a band which is pschoacoustically not so important. An example of psychoacoustic model calculation is calculating the power of input spectrum. Assuming that the input spectrum is $x_{602}(i)$, the psychoacoustic weight $w_{psy}(k)$ is represented by $$w_{psy}(k) = \sum_{i=f_{pl}(k)}^{f_{pu}(k)} \left\{ x_{602}(i)^2 * \frac{1}{f_{pu}(k) - f_{pl}(k)} \right\} \quad (18)$$

The psychoacoustic weight 200605 so calculated is input to the arrangement decision unit 200603, wherein a band at which the psychoacoustic weight 200605 amounts to the maximum is calculated with reference to the analysis scale 503 on the following condition. To be specific, when the analysis scale 503 is small (e.g., 128), the psychoacoustic weight 200605 of a band having a large band number 200606 (e.g., 4) is increased, for example, to be twice, while when the analysis scale is not small, the psychoacoustic weight 200605 is used as it is. Then, the band number 200606 is sent to the coding band arrangement information generation unit 200604.

The coding band arrangement information generation unit 200604 receives the coding band information 200702, the band number 200606, and the coding condition 200105, and outputs coding band arrangement information 200109. To be specific, the coding band arrangement information generation unit 200604 outputs, by referring to the coding condition 200105, the coding band arrangement information 200109 comprising the coding band information 200702 and the band number 200606 being connected, as long as the coding band arrangement information 200109 is required. When the coding band arrangement information 200109 becomes unnecessary, the coding band arrangement information generation unit 200604 stops outputting the information 200109. For example, the unit 200604 continues to output the band number 200606 until the number of encoders which is specified by the coding condition 200105 is attained. Further, when the analysis scale 503 is small, the output band number 200606 may be fixed in the arrangement decision unit 200603.

Figure 17:
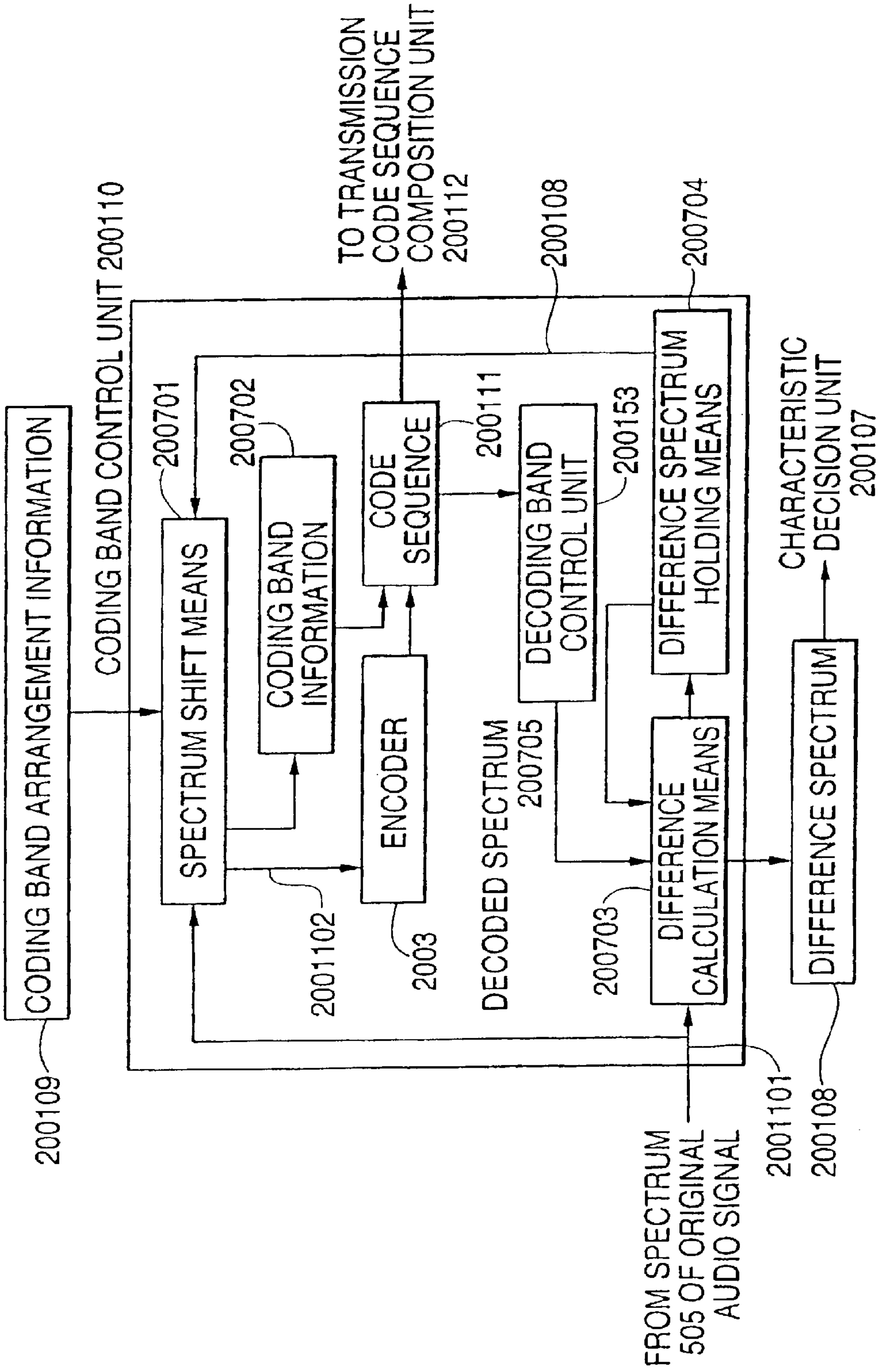
FIG. 17 is a block diagram illustrating a coding band control unit in the coding apparatus of the second embodiment.

Next, the operation of the coding band control unit 200110 will be described with reference to FIG. 17.

Figure 20:
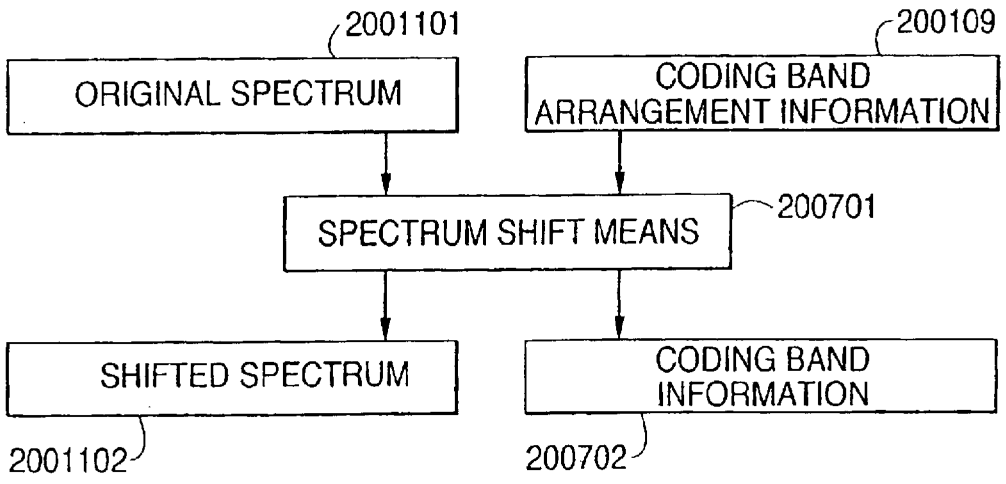
FIG. 20 is a block diagram illustrating a spectrum shift means in the coding apparatus of the second embodiment.

The coding band control unit 200110 receives the coding band arrangement information 200109 output from the characteristic decision unit 200107 and the spectrum 505 of the original audio signal, and outputs the code sequence 200111 and the difference spectrum 200108. The coding band control unit 200110 comprises a spectrum shift means 200701 which receives the coding band arrangement information 200109, and shifts the difference spectrum 200108 between the spectrum 505 of the original audio signal and the decoded spectrum 200705 obtained by coding the spectrum 505 of the original audio signal in the past and decoding the same, to the band of the band number 200606; an encoder 2003; a difference calculation means 200703 which takes a difference between the spectrum 505 of the original audio signal and the decoded spectrum 200705; a difference spectrum holding means 200704; and a decoding band control unit 200153 which subjects the composite spectrum 2001001 which is obtained by the code sequence 200111 being decoded by the decoder 2004, to the spectrum shifting using the coding band arrangement information 200702, and calculates the decoded spectrum 200705 by using the shifted composite spectrum. The structure of the spectrum shift means 200701 is shown in FIG. 20. The spectrum shift means 200701 receives the original spectrum 2001101 to be shifted and the coding band arrangement information 200109. Amongst the inputs to the spectrum shift means 200701, the spectrum 2001101 to be shifted is either the spectrum 505 of the original audio signal or the difference spectrum 200108, and the spectrum shift means 200701 shifts the spectrum to the band of the band number 200606 to output the shifted spectrum 2001102 and the coding band information 200702 included in the coding band arrangement information 200109. The band corresponding to the band number 200606 is obtained from fpl(k) and fpu(k) of the coding band information 200702. The shifting procedure is to move the spectrums between fpl(k) and fpu(k) up to the band which can be processed by the encoder 2003.

The encoder 2003 receives the spectrum 2001102 so shifted, and outputs a normalized code sequence 303 and a residual code sequence 304 as shown in FIG. 15. These sequences 303 and 304 and the coding band information 200702 which is output from the spectrum shift means 200701 are output as a code sequence 200111 to the transmission code composition unit 200112 and to the decoding band control unit 200153.

The code sequence 200111 output from the encoder 2003 is input to the decoding band control unit 200153 in the coding band control unit 20011. The decoding band control unit 200153 operates in the same manner as the decoding band control unit 200153*b* included in the decoding apparatus 2002.

Figure 19:
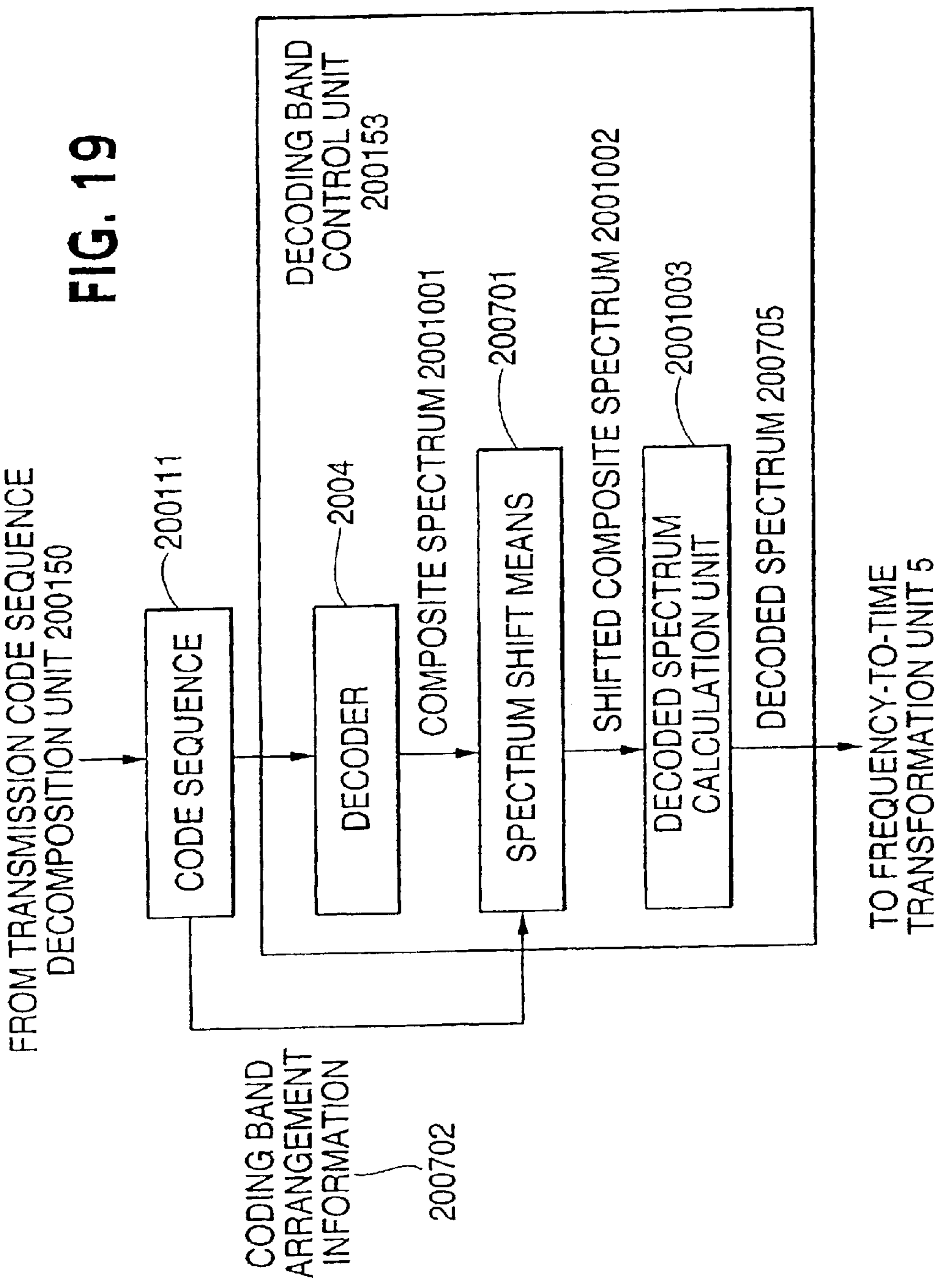
FIG. 19 is a block diagram illustrating a decoding band control unit in the coding apparatus of the second embodiment.

The structure of the decoding band control unit 200153 is shown in FIG. 19.

The decoding band control unit 200153 receives the code sequence 200111 from the transmitted code sequence decomposition unit 200150, and outputs a decoded spectrum 200705. The decoding band control unit 200153 includes a decoder 2004, a spectrum shift means 200701, and a decoded spectrum calculation unit 2001003.

Figure 18:
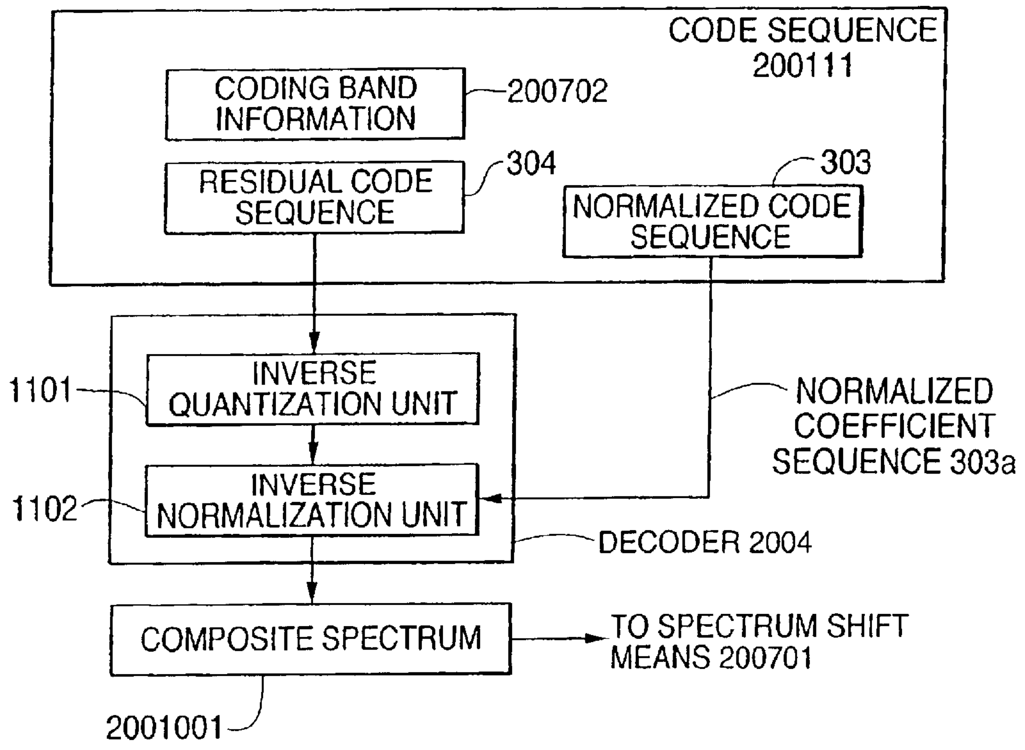
FIG. 18 is a block diagram illustrating a decoder included in the coding apparatus of the second embodiment.

The structure of the decoder 2004 is shown in FIG. 18.

The decoder 2004 comprises an inverse quantization unit 1101 and an inverse normalization unit 1102. The inverse quantization unit 1101 receives the residual code sequence 304 in the code sequence 200111, transforms the residual code sequence 304 to a code index, and reproduces the code by referring to the code book used in the encoder 2003. The reproduced code is sent to the inverse normalization unit 1102, wherein the code is multiplied by the normalized coefficient sequence 303*a* reproduced from the normalized code sequence 303 in the code sequence 200111, to produce a composite spectrum 2001001. The composite spectrum 2001001 is input to the spectrum shift means 200701.

Although the output of the decoding band control unit 200153 included in the coding band control unit 200110 is the decoded spectrum 200705, this is identical to the composite spectrum 2001001 which is output from the decoding band control unit 200153 included in the decoding apparatus 2002.

The composite spectrum 2001001 obtained by the decoder 2004 is shifted by the spectrum shift means 200701 to be a shifted composite spectrum 2001002, and the shifted composite spectrum 2001002 is input to the decoded spectrum calculation unit 2001003.

In the decoded spectrum calculation unit 2001003, the input composite spectrum is retained, and this spectrum is added to the latest composite spectrum to generate the decoded spectrum 200705 to be output.

The difference calculation means 200703 in the coding band control unit 200110 calculates a difference between the spectrum 505 of the original audio signal and the decoded spectrum 200705 to output a difference spectrum 200108, and this spectrum 200108 is fed back to the characteristic decision unit 200107. At the same time, the difference spectrum 200108 is held by the difference spectrum holding means 200704 to be sent to the spectrum shift means 200701 for the next input of the coding band arrangement information 200109. In the characteristic decision unit 200107, the coding band arrangement information generation means continues outputting the coding band arrangement information 200109 with reference to the coding condition until the coding condition is satisfied. When the output of the coding band arrangement information 200109 is stopped, the operation of the coding band control unit 200110 is also stopped. The coding band control unit 200110 has the difference spectrum holding means 200704 for the calculation of the difference spectrum 200108. The difference spectrum holding means 200704 is a storage area for holding difference spectrums, for example, an array capable of storing 2048 pieces of numbers.

As described above, the process of the character decision unit 200107 and the subsequent process of the coding band control unit 200110 are repeated to satisfy the coding condition 200105, whereby the code sequences 200111 are successively output and transmitted to the transmission code sequence composition unit 200112. In the transmission code sequence composition unit 200112, the code sequences 200111 are composited with the analysis scale code sequence 510 to generate a transmission code sequence. The composite code sequence is transmitted to the decoding apparatus 2002.

In the decoding apparatus 2002, the transmission code sequence transmitted from the coding apparatus 2001 is decomposed to a code sequence 200151 and an analysis scale code sequence 200152 by the transmission code sequence decomposition unit 200150. The code sequence 200151 and the analysis scale code sequence 200152 are identical to the code sequence 200111 and the analysis scale code sequence 510 in the coding apparatus 2001, respectively.

The code sequence 200151 is transformed to a decoded spectrum 200154*b* in the decoding band control unit 200153*b*, and the decoded spectrum 200154*b* is transformed to a time-domain signal in the frequency-to-time transformation unit 5, the window multiplication unit 6, and the frame overlapping unit 7, by using the information of the analysis scale code sequence 200152, resulting in a decoded signal 8.

As described above, the audio signal coding and decoding apparatus according to the second embodiment is similar to the first embodiment in being provided with the characteristic decision unit which decides the frequency band of an audio signal to be quantized by each encoder of multiple-stage encoders; and the coding band control unit which receives the frequency band decided by the characteristic decision unit, and the time-to-frequency transformed original audio signal as inputs, and decides the connecting order of the encoders and transforms the quantization bands of the respective encoders and the connecting order to code sequences, thereby performing adaptive scalable coding. In this second embodiment, the coding apparatus further includes the coding band control unit including the decoding band control unit, and the decoding apparatus further includes a decoding band control unit. Further, the spectrum power calculation unit included in the characteristic decision unit of the first embodiment is replaced with the psychoacoustic model calculation unit and, further, the characteristic decision unit includes the coding band arrangement information generation means. Since the spectrum power calculation unit in the characteristic decision unit is replaced with the psychoacoustic model calculation unit, the psychoacoustically important part (band) of the audio signal is accurately judged, whereby this band can be selected more frequently. Further, while in the audio signal coding and decoding apparatus of the present invention, when the coding condition is satisfied during executing the operation to decide the arrangement of the encoders, the coding process is decided as satisfied and no coding band arrangement information is output, in the operation to decide the arrangement of the encoders, the respective band widths when selecting the bands for arranging the encoders and the weights of the respective bands are fixed in the characteristic decision unit in the first embodiment of the invention. To the contrary, in this second embodiment, since the judgement condition of the characteristic decision unit includes the sampling frequency of the input signal and the compression ratio, i.e., the bit rate at coding, the degree of weighting on the respective frequency bands when selecting the arrangement of the encoders in the respective bands can be varied. Further, since the judgement condition of the characteristic decision unit includes the compression ratio, by performing such control that when the compression ratio is high (i.e., when the bit rate is low), the degree of weighting on selecting the respective bands is not varied very much when the compression ratio is low (i.e., when the bit rate is high), the degree of psychoacoustic weighting on selecting the respective bands is much changed so as to emphasize the psychoacoustically important part to improve the efficiency, and the best balance between the composition ratio and the quality can be obtained. As a result, the audio signal coding and decoding apparatus according to the second embodiment exhibits sufficient performance when coding various audio signals.

What is claimed is:

1. An audio signal coding apparatus receiving an audio signal which has been time-to-frequency transformed, and outputting a coded audio signal, said apparatus comprising:

a first-stage encoder operable to quantize the time-to-frequency transformed audio signal;

second-and-subsequent-stages of encoders each operable to quantize a quantization error output from a previous-stage encoder;

a characteristic decision unit operable to judge a characteristic of the time-to-frequency transformed audio signal, and decide a frequency band of the audio signal to be quantized by each of the encoders; and a coding band control unit operable to receive the frequency band decided by the characteristic decision unit and the time-to-frequency transformed audio signal, decide a connecting order of the respective encoders in each of the multiple stages, and transform the quantization bands of the respective encoders and the connecting order of the encoders to code sequences.

2. The audio signal coding apparatus of claim 1 wherein each of the encoders comprises:

a normalization unit operable to calculate a normalized coefficient sequence for normalizing the time-to-frequency transformed audio signal, from the audio signal, quantize the normalized coefficient sequence by using a vector quantization method, and output a normalized signal obtained by normalizing the time-to-frequency audio signal; and at least one vector quantization unit operable to quantize the normalized signal.

3. The audio signal coding apparatus according to claim 2, wherein the coding band control unit selects a frequency band having an energy addition sum of quantization error larger than a predetermined value, as the frequency band of the audio signal to be quantized by each encoder.

4. The audio signal coding apparatus according to claim 2 wherein said coding band control unit selects a frequency band having an energy addition sum of quantization error larger than a predetermined value, wherein the frequency band is heavily weighted with regard to psychoacoustic characteristics of human beings, as a frequency band of the audio signal to be quantized by each encoder.

5. The audio signal coding apparatus according to claim 2 wherein said coding band control unit retrieves, at least once, the whole frequency band of the input audio signal.

6. The audio signal coding apparatus of claim 2, wherein said vector quantization unit calculates a quantization error in vector quantization by using a vector quantization method with a code book, and outputs the result of the vector quantization as a code sequence.

7. The audio signal coding apparatus of claim 6, wherein said vector quantization unit uses, for retrieval of an optimum code in the vector quantization, a code vector in which all or part of the codes of the vector are inverted.

8. The audio signal coding apparatus of claim 6, wherein said vector quantization unit extracts, in calculating distances which are used for retrieving an optimum code in vector quantization, a code giving a minimum distance by using the normalized coefficient sequence calculated by the normalization unit as a weight.

9. The audio signal coding apparatus of claim 6, wherein said vector quantization unit extracts, in calculating distances which are used for retrieving an optimum code in vector quantization, a code giving the minimum distance by using, the normalized coefficient sequence calculated by the normalization unit and a value in consideration of psychoacoustic characteristics of human beings as weights.

10. An audio signal decoding apparatus for decoding a coded audio signal which is output from the audio signal coding apparatus of claim 1 to output an audio signal, said apparatus comprising:

an inverse quantization unit comprising a single inverse quantizer or multiple-stages of inverse quantizers, operable to reproduce a coefficient sequence of the time-to-frequency transformed audio signal, from the input audio signal code sequence, on the basis of the quantization bands of the respective encoders of each of the multiple stages and the connecting order of these encoders; and a frequency-to-time transformation unit operable to transform the output of the inverse quantization unit, which is the coefficient sequence of the time-to-frequency transformed audio signal, to a signal corresponding to the original audio signal.

11. The audio signal decoding apparatus of claim 10, wherein:

said inverse quantization unit receives a code sequence output from each of the encoders of the respective frequency bands, and reproduces the coefficient sequence of the time-to-frequency transformed audio signal from the code sequences;

said inverse quantization unit includes an inverse normalization unit operable to receive the coefficient sequence of the time-to-frequency transformed audio signal, which is output from the inverse quantization unit, and a normalized code sequence output from each of the encoders of the respective frequency bands in the audio signal coding apparatus, and obtain a signal corresponding to the time-to-frequency transformed audio signal; and said frequency-to-time transformation unit transforms the output of the inverse normalization unit to a signal corresponding to the original audio signal.

12. The audio signal decoding apparatus according to claim 11, wherein said inverse quantization unit performs inverse quantization by using only the codes which are output from some of the encoders in the audio signal coding apparatus.

13. The audio signal decoding apparatus according to claim 10, wherein said inverse quantization means performs inverse quantization by using only the codes which are output from some of the plurality of encoders in the audio signal coding apparatus.

14. The audio signal coding apparatus of claim 1, wherein said characteristic decision unit selects a band to be quantized in accordance with a signal obtained by processing the time-to-frequency transformed audio signal input to the characteristic decision unit by a low-pass filter.

15. The audio signal coding apparatus of claim 1, wherein said characteristic decision unit selects a band to be quantized, in accordance with a signal obtained by subjecting the time-to-frequency transformed audio signal input to the characteristic decision unit to a processing including logarithmic calculation.

16. The audio signal coding apparatus of claim 1, wherein said characteristic decision unit selects a band to be quantized, in accordance with a signal obtained by processing the time-to-frequency transformed audio signal input to the characteristic decision unit by a high-pass filter.

17. The audio signal coding apparatus of claim 1, wherein said characteristic decision unit selects a band to be quantized in accordance with a signal obtained by processing the time-to-frequency transformed audio signal input to the characteristic decision unit by a band-pass filter or a band-rejection filter.

18. The audio signal coding apparatus of claim 1, wherein said characteristic decision unit decides the characteristic of the input audio signal, and selects a frequency band to be quantized by each encoder in accordance with the result of the decision.

19. The audio signal coding apparatus of claim 18, wherein said characteristic decision unit decides the characteristic of the input audio signal and restricts the frequency band to be quantized by each encoder in accordance with the result of the decision.

20. The audio signal coding apparatus of claim 19, wherein, when the frequency band is divided into a low-band, an intermediate-band, and a high-band, and the frequency bands to be quantized by the respective encoders are to be restricted, and when the input audio signal has variable characteristics, the frequency bands to be quantized are controlled so that the high-band is selected more often than the low-band and the intermediate band.

21. The audio signal coding apparatus of claim 19, wherein, when the frequency band is divided into a low-band, an intermediate-band, and a high-band, and the high-band is selected more than the low-band and the intermediate-band as the frequency band to be quantized by the respective encoders, the frequency bands to be quantized are controlled so that most of the frequency bands to be quantized are in the high-band, for a predetermined period from when the high-band is selected.

22. The audio signal coding apparatus of claim 19, wherein the frequency band is divided into a low-band, an intermediate-band and a high-band, and the characteristic of the original input audio signal is judged, and the frequency bands to be quantized by the respective encoders are fixed dependent on a result of the judgment.

23. The audio signal coding apparatus of claim 1, wherein said characteristic decision unit uses one or both of a frequency outline of the time-to-frequency transformed audio signal and a normalized coefficient sequence calculated by a normalization unit, as a weight or weights for deciding the quantization band of the respective encoders.

24. The audio signal coding apparatus of claim 1, wherein:

the characteristic decision unit is operable to judge psychoacoustic and physical characteristics of the audio signal to be quantized by the respective encoders of each stage;

the coding band control unit is operable to control an arrangement of the frequency bands to be quantized by the respective encoders of each stage, in accordance with a coding band arrangement information decided by the characteristic decision unit; and processings by the characteristic decision unit and the coding band control unit are repeated until a predetermined coding condition is satisfied.

25. The audio signal coding apparatus of claim 24, wherein said characteristic decision unit comprises:

a coding band calculation unit which receives a predetermined coding condition and calculates coding band information indicating the coding bands of the respective encoders of each stage;

a psychoacoustic model calculation unit which receives the coding band information, an output of a predetermined filter which filters one of a frequency-domain audio signal and a difference spectrum, and outputs a psychoacoustic weight representing a phycho acoustic importance in the coding bands of the coding band information;

an arrangement decision unit which receives the psychoacoustic weight and an analysis scale output from an analysis scale decision unit, determines the arrangement of the encoders, and outputs the band numbers of the encoders; and a coding band arrangement information generation unit which receives the coding band information and the band numbers, and outputs coding band arrangement information in accordance with the predetermined coding condition.

26. The audio signal coding apparatus of claim 25, wherein, when the analysis scale is small, said arrangement decision unit controls the coding bands of the respective encoders so that the high-band is selected more than the low-band and the intermediate band.

27. The audio signal coding apparatus of claim 25, wherein, when the analysis scale is small, said arrangement decision unit controls the coding bands so that the high-band is selected more than the low-band and intermediate-band for a predetermined period from when the high-band is selected.

28. The audio signal coding apparatus of claim 25 wherein said coding band calculation unit has a functional relation between the coding band information which is the output from the coding band calculation unit and the bit rate or the sampling frequency of the input signal included in the predetermined coding condition, wherein the functional relation comprises one of a polynomial function, a logarithmic function, and a combination of the polynomial function and the logarithmic function.

29. The audio signal coding apparatus of claim 28 wherein, when the total number of the encoders is three or more as one of the coding conditions, an upper limit of the coding band of the third encoder in the order of increasing frequency is at least half of the frequency band of the original audio signal.

30. The audio signal coding apparatus of claim 28 wherein said coding band calculation unit employs as the function making the functional relation, a function having weighting in consideration of psychoacoustic characteristics of human beings.

31. The audio signal coding apparatus of claim 25, wherein said arrangement decision unit determines the arrangement of the bands to be coded by the respective encoders of each stage; and a plurality of patterns of arrangement of the respective encoders are prepared in advance, wherein the plurality of patterns are switched between so as to improve coding efficiency.

32. The audio signal coding apparatus of claim 25, wherein, when the characteristic of the input audio signal is stationary and the analysis scale is large, the arrangement decision unit has a small value as the maximum value of the band to be coded by the respective encoders of each stage.

33. The audio signal coding apparatus of claim 25, wherein a filter to be connected at a previous stage to the respective encoders is one of a low-pass filter, a high-pass filter, a band-pass filter, and a band-rejection filter, or a combination of two or more of these filters.

34. The audio signal coding apparatus of claim 24, wherein said coding band control unit comprises:

a spectrum shift unit which receives the time-to-frequency transformed audio signal and the coding band arrangement information and shifts the spectrum of the input audio signal to a specified band;

an encoder which encodes the output of the spectrum shifting unit, to output a code sequence;

a decoding band control unit which decodes the code sequence output from the encoder to output a decoded spectrum;

a difference calculation unit which calculates a difference between the decoded spectrum and the time-to-frequency transformed audio signal; and a difference spectrum holding unit which holds the current difference information up to a next operation period of the coding band control unit.

35. The audio signal coding apparatus of claim 34 wherein said decoding band control unit comprises:

a decoder which decodes the code sequence, to output a composite spectrum;

a spectrum shift unit operable to shift the composite spectrum to a specified band, in accordance with the coding band arrangement information included in the code sequence; and a decoded spectrum calculation unit which holds a current composite spectrum up to the next operation period of the decoding band control unit starts and adds a past composite spectrum and the current composite spectrum.

36. An audio signal coding and decoding apparatus comprising the audio signal coding apparatus of claim 35 and an audio signal decoding apparatus for decoding a coded audio signal output from the audio signal coding apparatus to output an audio signal, wherein said audio signal decoding apparatus includes a decoding band control unit that is identical to the decoding band control unit included in the audio signal coding apparatus.

37. An audio signal decoding apparatus for decoding a coded audio signal which is output from the audio signal coding apparatus of claim 35 to output an audio signal, wherein the audio signal decoding apparatus comprises a decoding band control unit that is identical to the decoding band control unit included in the audio signal coding apparatus.

38. The audio signal decoding apparatus of claim 37, wherein said inverse quantization unit performs inverse quantization by using only part of the codes which are output from the audio signal coding apparatus.

39. The audio signal decoding apparatus of claim 37, wherein the spectrum shift unit included in the audio signal coding apparatus receives a spectrum to be shifted and the coding band arrangement information, and outputs the coding band information and the shifted spectrum.

40. The audio signal coding apparatus according to claim 1, wherein the coding band control unit selects a frequency band having an energy addition sum of quantization error larger than a predetermined value, as a frequency band of the audio signal to be quantized by each encoder.

41. The audio signal coding apparatus according to claim 1, wherein said coding band control unit selects a frequency band having an energy addition sum of quantization error larger than a predetermined value, which band is heavily weighted with regard to psychoacoustic characteristics of human beings, as a frequency band of the audio signal to be quantized by each encoder.

42. The audio signal coding apparatus according to claim 1, wherein said coding band control unit retrieves, at least once, the whole frequency band of the input audio signal.

43. An audio signal coding apparatus comprising a characteristic decision unit, a coding band control unit, and a coding unit, for transforming an audio signal which has been time-to-frequency transformed, to a code sequence, wherein said code sequence includes code information and a band control sequence, said coding unit comprises a pluarlity of encoders, performs multiple-stage coding of the audio signal by the control of the coding band control unit, and outputs the code information, said characteristic decision unit judges the inputted audio signal, and outputs a band weight information indicating the weighting of each of the coded frequency band, said coding band control unit decides a quantization band and a connecting order of the respective encoders constituting the multiple-stage coding, in accordance with the band weight information, said coding band control unit performs a scalable multiple-stage coding in the coding unit, in accordance with the decided quantization band and connecting order of the respective encoders, and said coding band control unit outputs the band control code sequence including the decided quanitzation band and connecting order of the respective encoders.

44. The audio signal coding apparatus of claim 43, wherein the coding band control unit decides the quantization band of the respective encoders and the connecting order of the respective encoders so as to execute one of the encoders including a predetermined multiple-stage coding.

45. The audio signal coding apparatus of claim 43, wherein the coding unit outputs a quantization error, and wherein the coding band control unit decides the quantization band of the respective encoders and the connecting order of the respective encoders, in accordance with the band weight information and the quantization error.

46. An audio signal decoding apparatus comprising a decoding band control unit and a decoding unit, for decoding a code sequence including code information and a band control code sequence as an audio signal, wherein said band control code sequence, when the code information is multiple-stage coded, indicates a quantization band and a connecting order of respective encoders, said decoding unit comprises a pluarlity of decoders, and performs multiple-stage decoding of the code information by the control of the decoding band control unit, and said decoding band control unit performs a scalable multiple-stage decoding in the decoding unit, in accordance with the band control code sequence.

* * * * *